(12) United States Patent
Takahashi et al.

(10) Patent No.: US 7,812,727 B2
(45) Date of Patent: Oct. 12, 2010

(54) WIRELESS TAG DETERMINATION METHOD, WIRELESS TAG DETERMINATION SYSTEM, READER CONTROL DEVICE, AND STORAGE MEDIUM

(75) Inventors: Eiichi Takahashi, Kawasaki (JP); Tatsuro Matsumoto, Kawasaki (JP); Kazuo Sasaki, Kawasaki (JP); Masayuki Fukui, Kawasaki (JP); Ai Yano, Kawasaki (JP); Masahiro Hara, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 12/137,168

(22) Filed: Jun. 11, 2008

(65) Prior Publication Data

US 2009/0036060 A1 Feb. 5, 2009

(30) Foreign Application Priority Data

Jul. 31, 2007 (JP) .............................. 2007-199880

(51) Int. Cl.
G08B 13/14 (2006.01)
(52) U.S. Cl. .................................... 340/572.1; 382/181
(58) Field of Classification Search .............. 340/572.1, 340/572.4, 572.8, 10.1, 5.61; 382/181
See application file for complete search history.

(56) References Cited

U.S. PATENT DOCUMENTS

| | | | |
|---|---|---|---|
| 6,992,587 B2 * | 1/2006 | Maeda et al. ............ | 340/572.1 |
| 7,180,050 B2 * | 2/2007 | Imagawa et al. ........... | 340/5.61 |
| 7,362,219 B2 * | 4/2008 | Nogami et al. ........... | 340/572.4 |
| 2006/0022814 A1 | 2/2006 | Nogami et al. | |
| 2006/0214773 A1 * | 9/2006 | Wagner et al. ............. | 340/10.2 |
| 2006/0269100 A1 | 11/2006 | Saito et al. | |
| 2007/0008136 A1 | 1/2007 | Suzuki | |
| 2008/0061937 A1 * | 3/2008 | Park ......................... | 340/10.1 |

FOREIGN PATENT DOCUMENTS

| | | |
|---|---|---|
| JP | 2002-271229 | 9/2002 |
| JP | 2005-228292 | 8/2005 |
| JP | 2005-234669 | 9/2005 |
| JP | 2006-010532 | 1/2006 |
| JP | 2006-040035 | 2/2006 |
| JP | 2006-040059 | 2/2006 |
| JP | 2006-195946 | 7/2006 |
| JP | 2006-350806 | 12/2006 |

* cited by examiner

*Primary Examiner*—John A Tweel, Jr.
(74) *Attorney, Agent, or Firm*—Staas & Halsey LLP

(57) ABSTRACT

A system and method for determining a failed wireless tag includes capturing images of articles having wireless tags, recognizing an image including wireless tags from among captured images calculating a number of wireless tags and distance information from the reader to each wireless tag based on the recognized image including wireless tags; changing a read range of the reader based on a location wireless tag having a predetermined distance information from the reader; and changing the read range of the reader when a number of wireless tags read by the reader and a number of wireless tags calculated do not match and determining a failed wireless tag based on the changed read range and distance information calculated.

17 Claims, 31 Drawing Sheets

FIG. 4

LOCATION TAG FILE                                151

| LID | DISTANCE (cm) | OUTPUT VOLTAGE VALUE (V) |
|-----|---------------|--------------------------|
| L01 | 10 | v1 |
| L02 | 20 | v2 |
| L03 | 30 | v3 |
| L04 | 40 | v4 |
| L05 | 50 | v5 |
| ... | ... | ... |
| L30 | 300 | v30 |

FIG. 6

IMAGE RECOGNITION FILE 152

| IMAGE NUMBER | DISTANCE (cm) |
|---|---|
| 1 | 31 |
| 2 | 63 |
| 3 | 89 |
| 4 | 120 |
| 5 | 150 |
| 6 | 180 |
| 7 | 210 |
| 8 | 240 |

FIG. 15A

SUB-IMAGE RECOGNITION FILE 153

| IMAGE NUMBER | ORIGINAL IMAGE NUMBER | DISTANCE (cm) |
|---|---|---|
|  | 1 | 31 |
|  | 2 | 63 |
| 1 | 3 | 89 |
| 2 | 4 | 120 |
|  | 5 | 150 |
|  | 6 | 180 |
|  | 7 | 210 |
|  | 8 | 240 |

FIG. 15B

SUB-IMAGE RECOGNITION FILE 153

| IMAGE NUMBER | ORIGINAL IMAGE NUMBER | DISTANCE (cm) |
|---|---|---|
|  | 1 | 31 |
|  | 2 | 63 |
|  | 3 | 89 |
|  | 4 | 120 |
| 1 | 5 | 150 |
| 2 | 6 | 180 |
| 3 | 7 | 210 |
| 4 | 8 | 240 |

FIG. 18

ANGLE FILE 154

| DISTANCE (cm) | ANGLE (°) |
|---|---|
| 10 | 0 |
| 20 | 5 |
| 30 | 10 |
| ... | ... |

FIG. 19

START
↓
READ DISTANCE OF FAILED WIRELESS TAG — S191
↓
OUTPUT ON SIGNAL AND DISTANCE TO LASER CONTROLLER — S192
↓
READ IRRADIATION ANGLE FROM ANGLE FILE — S193
↓
OUTPUT IRRADIATION ANGLE TO ANGLE ADJUSTMENT MECHANISM — S194
↓
CHANGE IRRADIATION ANGLE OF LASER — S195
↓
OUTPUT ON SIGNAL TO LASER — S196
↓
IRRADIATE THE FAILED WIRELESS TAG WITH LASER LIGHT — S197
↓
END

FIG. 23
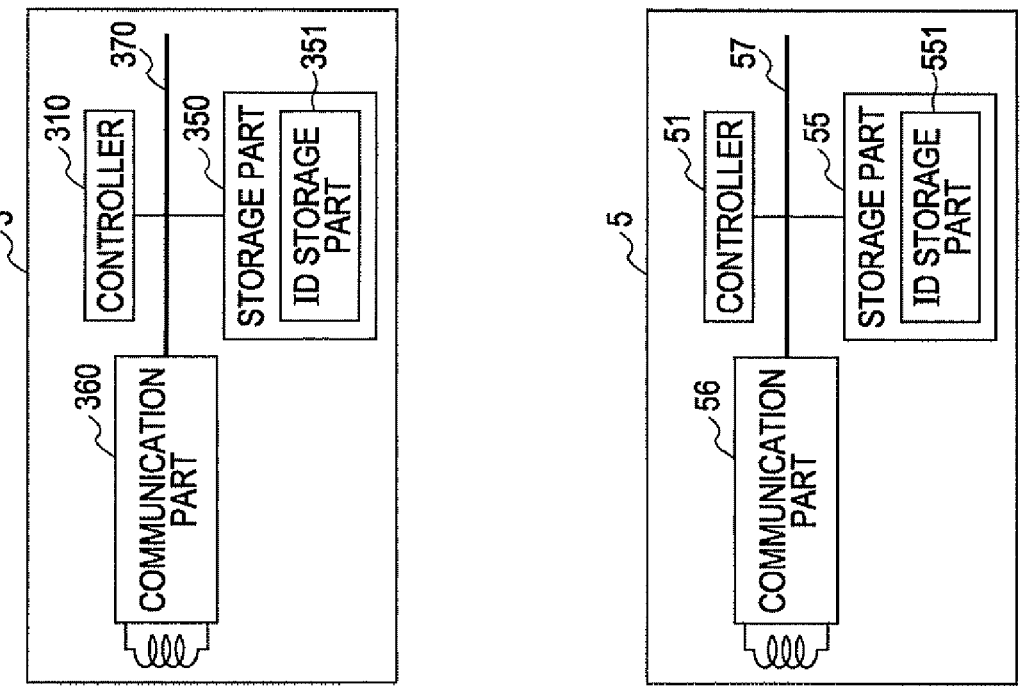
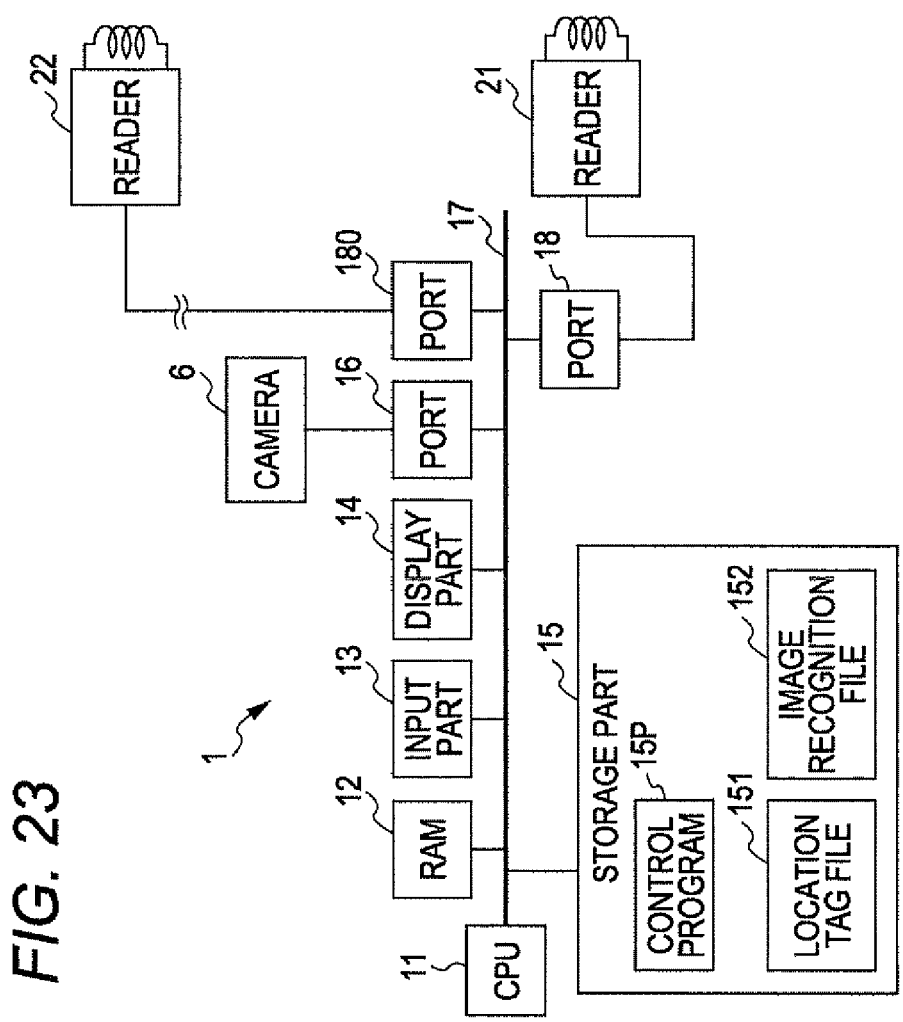

FIG. 24

LOCATION TAG FILE                                          151

| LID | DISTANCE FROM FIRST READER (cm) | OUTPUT VOLTAGE VALUE OF FIRST READER (V) | DISTANCE FROM SECOND READER (cm) | OUTPUT VOLTAGE VALUE OF SECOND READER (V) |
|-----|---------------------------------|------------------------------------------|----------------------------------|--------------------------------------------|
| L01 | 10  | v1  | 300 | v30 |
| L02 | 20  | v2  | 290 | v29 |
| L03 | 30  | v3  | 280 | v28 |
| L04 | 40  | v4  | 270 | v27 |
| L05 | 50  | v5  | 260 | v26 |
| ⋮   | ⋮   | ⋮   | ⋮   | ⋮   |
| L29 | 290 | v29 | 20  | v2  |
| L30 | 300 | v30 | 10  | v1  |

FIG. 28
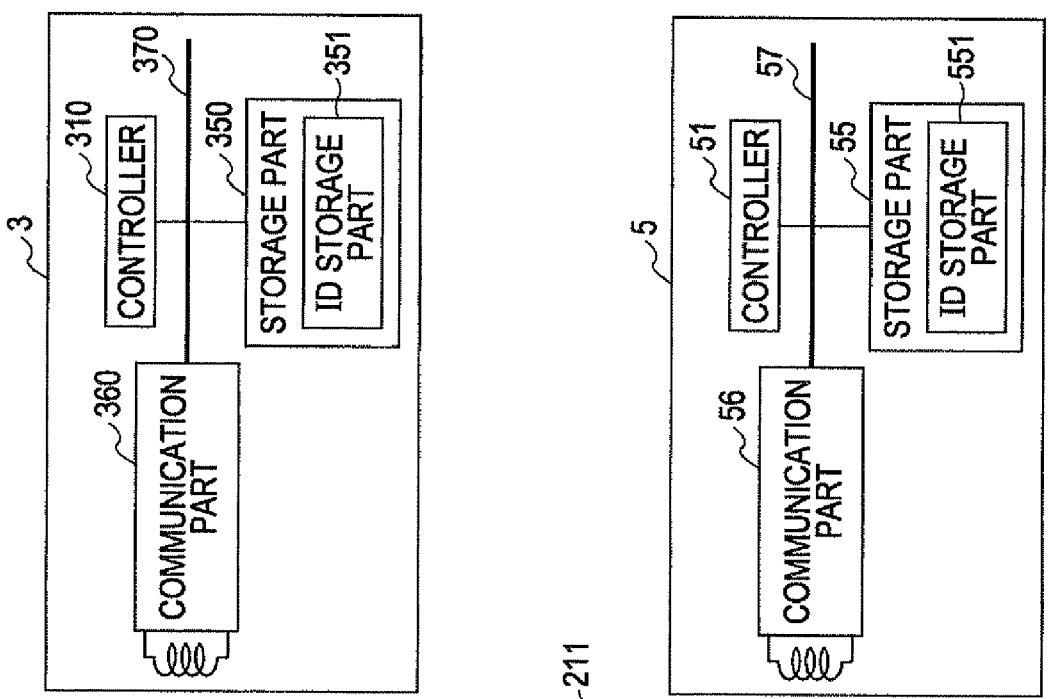
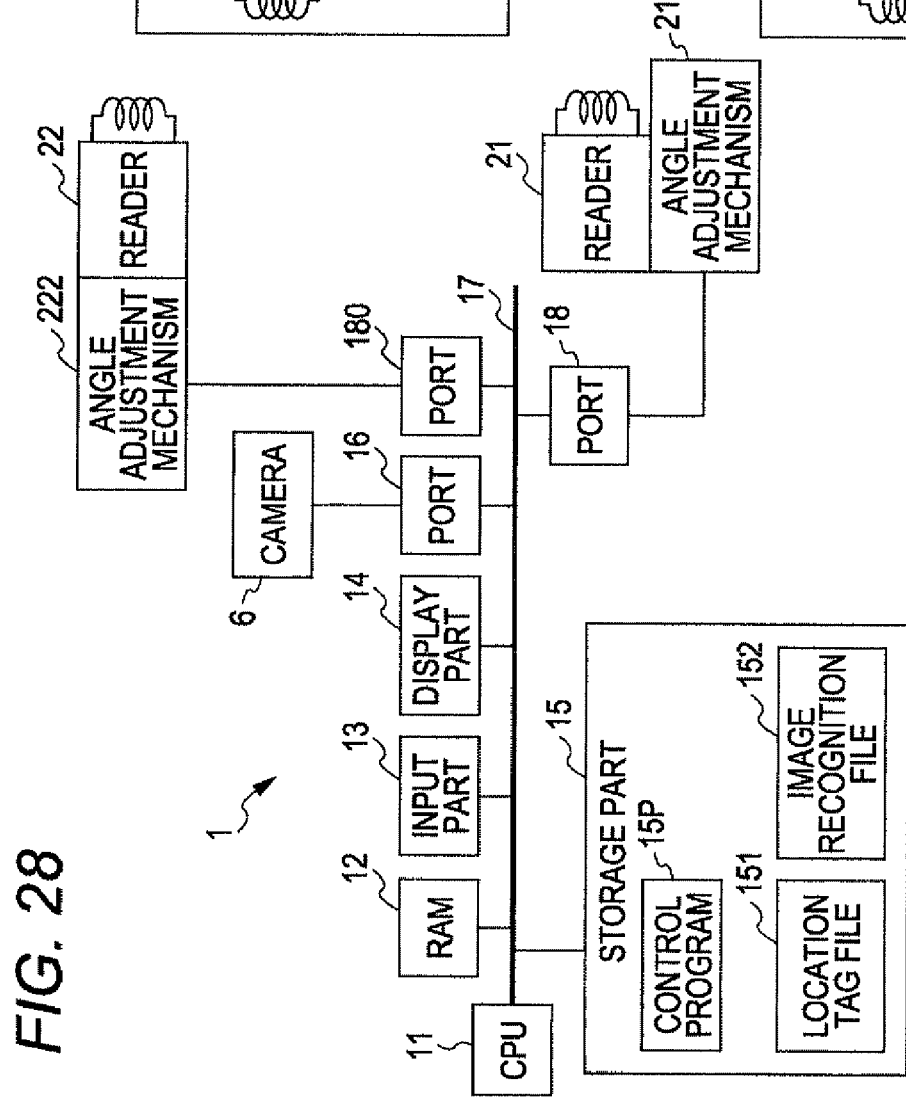

WIRELESS TAG DETERMINATION METHOD, WIRELESS TAG DETERMINATION SYSTEM, READER CONTROL DEVICE, AND STORAGE MEDIUM

CROSS-REFERENCE TO RELATED APPLICATIONS

This application is based upon and claims the benefit of priority from the prior Japanese Patent Application No. 2007-199880, filed on Jul. 31, 2007, the entire contents of which are incorporated herein by reference.

BACKGROUND

1. Field

The present invention relates to a wireless tag determination method for determining a failed wireless tag by a reader control device for controlling a reader that transmits/receives information to/from wireless tags, a wireless tag determination system, a reader control device, and a storage medium recording a program for causing the reader control device to execute operation(s).

2. Description of the Related Art

At locations of physical distribution management in recent years, generally, merchandise is managed by attaching wireless tags to merchandise and reading information contained in a memory of wireless tags by a reader/writer or writing necessary information. Physical distribution management by wireless tags is coming into widespread use rapidly taking the place of the bar code and is increasingly used not only for physical distribution management, but also for a variety of other situations. Moreover, a technology to perform, in addition to recognition of a wireless tag by a reader, image recognition by using a CCD camera to improve distinctiveness of each wireless tag for the reader has been discussed (See Japanese Patent Application Laid-Open (JP-A) No. 2006-350806).

When reading each wireless tag attached to a plurality of articles by a reader, a wireless tag may not be readable due to a failure or the like. In such a case, there is a problem that it is troublesome that a user must investigate individually to determine which wireless tag among a plurality of wireless tags has failed. Such a problem has led to more inefficiency with an increasing number of wireless tags to be read. The technology described in JP-A-2006-350806 only determines whether the number of articles recognized by a camera and that of wireless tags recognized by a reader match and provides no means for solving such a problem and other existing problems.

SUMMARY

The disclosed wireless tag determination method determines a failed wireless tag by a reader control device controlling a reader that transmits/receives information to/from wireless tags. The method includes capturing images of articles having wireless tags by an imaging device, executing a calculation operation in which a controller of the reader control device recognizes an image including wireless tags from among images captured and calculating a number of wireless tags and distance information from the reader to each wireless tag based on the recognized image including wireless tags, changing a read range of the reader based on a location wireless tag having a predetermined distance information from the reader. The disclosed method includes changing the read range of the reader when the number of wireless tags read by the reader and a number of wireless tags calculated do not match and determining a wireless tag that failed in reading by the reader based on the changed read range by the controller and distance information calculated.

The disclosed wireless tag determination system determines a failed wireless tag by using a reader for reading wireless tags, a reader control device for controlling the reader, and an imaging device for imaging wireless tags. The imaging device includes an image capturing part for capturing images of articles having wireless tags and an output part for outputting the images captured by the image capturing part to the reader control device, and the reader control device includes a calculation part for recognizing an image including wireless tags from among images output and calculating a number of wireless tags and distance information from the reader to each wireless tag based on the recognized image including wireless tags. The disclosed system includes a change means for changing a read range of the reader based on a location wireless tag having a predetermined distance information from the reader, and a determination part for changing the read range of the reader when a number of wireless tags read by the reader and the number wireless tags calculated do not match and determining a wireless tag that failed in a reading by the reader based on the changed read range and distance information calculated by the calculation part.

The disclosed reader control device includes controlling a reader that transmits/receives information to/from wireless tags, an image capturing part for capturing images of articles having wireless tags, calculation means for recognizing an image including wireless tags from among images captured and calculating a number of wireless tags and distance information from the reader to each wireless tag based on the recognized image including wireless tags. The disclosed device includes a change part for changing a read range of the reader based on a location wireless tag having a predetermined distance information from the reader, and a determination part for changing the read range of the reader when a number of wireless tags read by the reader and the number of wireless tags calculated do not match and determining a wireless tag that failed in a reading by the reader based on the changed read range and distance information calculated by the calculation part.

The disclosed computer readable medium embodying a program determines a failed wireless tag and controls a reader that transmits/receives information to/from wireless tags. The program causes the reader control device to execute operations including capturing images of articles having wireless tags, recognizing an image including wireless tags by a controller of the reader control device from among images captured and calculating a number of wireless tags and distance information from the reader to each wireless tag based on the recognized image including wireless tags. The operations include changing a read range of the reader by the controller based on a location wireless tag having a predetermined distance information from the reader, and changing the read range of the reader when a number of wireless tags read by the reader and the number of wireless tags calculated do not match and determining a wireless tag that failed in a reading by the reader based on the read range after being changed by the controller and distance information calculated at the calculation step.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 is an explanatory diagram showing a record layout of a location tag file;

FIG. 6 is an explanatory diagram showing a record layout of an image recognition file;

FIG. 15A and FIG. 15B is an explanatory diagram showing the record layout of a sub-image recognition file;

FIG. 18 is an explanatory diagram showing a record layout of an angle file;

FIG. 19 is a flow chart showing a procedure for control processing of laser;

FIG. 23 is a block diagram showing a hardware configuration of a computer, a wireless tag, and a location tag according to an embodiment;

FIG. 24 is an explanatory diagram showing a record layout of a location tag file according to an embodiment;

FIG. 28 is a block diagram showing a hardware configuration of a computer, a wireless tag, and a location tag according to an embodiment;

DETAILED DESCRIPTION OF THE EMBODIMENTS

Figure 1:
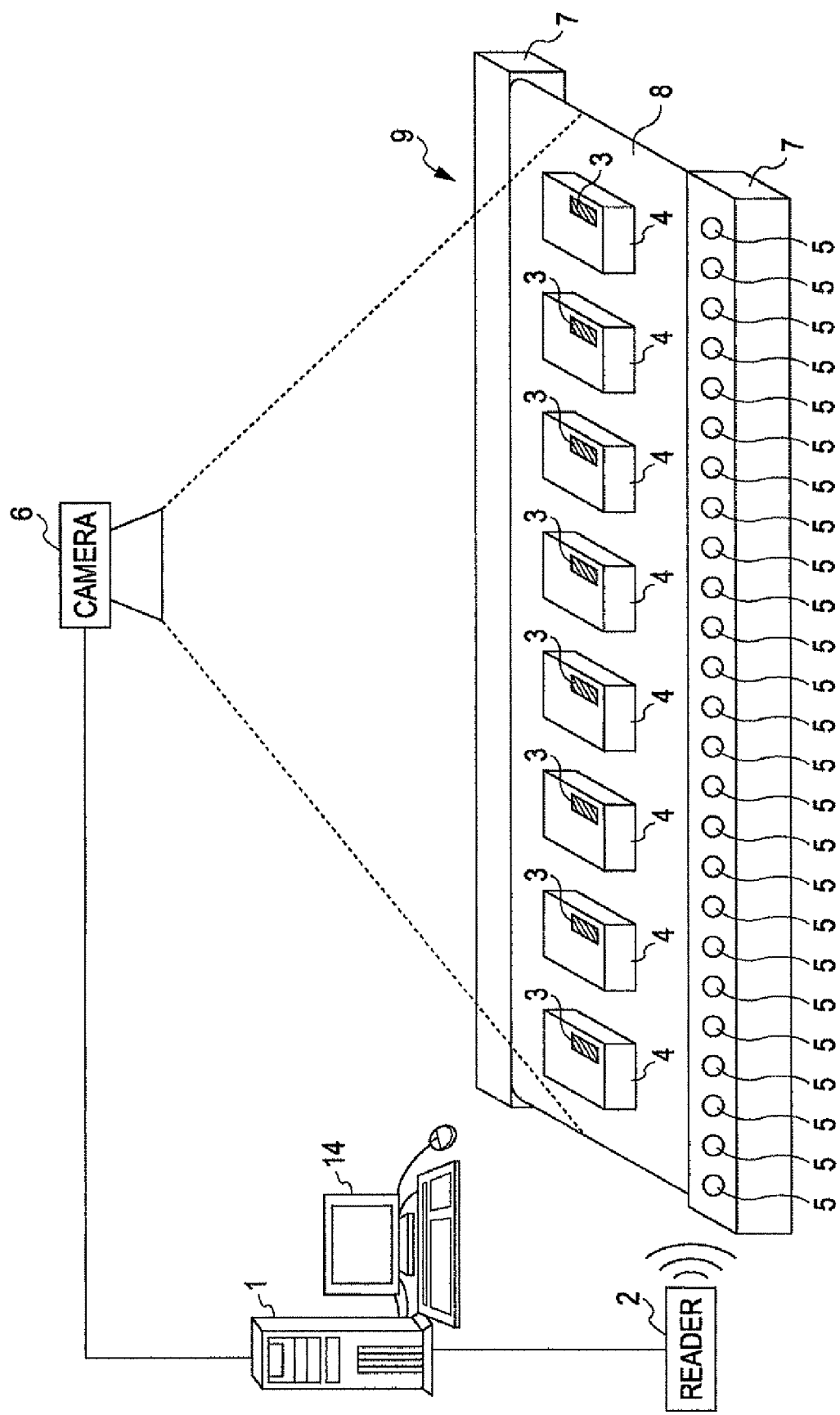
FIG. 1 is a schematic diagram showing an overview of a wireless tag determination system.

Reference will now be made in detail to the embodiments, examples of which are illustrated in the accompanying drawings, wherein like reference numerals refer to the like elements throughout. The embodiments are described below to explain the present invention by referring to the figures.

The present embodiment will be described below with reference to the drawings. FIG. 1 is a schematic diagram showing an overview of a wireless tag determination system. The wireless tag determination system (hereinafter, referred to as a determination system) includes an imaging device 6, a reader control device 1, a reader 2, a display part 14, a wireless tag for identification 5, and an examining table 9. The examining table 9 is, for example, a belt conveyor, a tray, or a loading platform of a truck. Articles 4, 4, ... on which wireless tags 3, 3, ... are mounted are placed on the examining table 9. In the present embodiment, the examining table 9 is assumed to be a belt conveyor 9 in association with the description below. The belt conveyor 9 includes supporting tables 7, 7 (supporters) and a belt 8 provided between the supporting tables 7, 7. The belt 8 carries the placed articles 4, 4, ... in a longitudinal direction of the supporting tables 7, 7 in a square pole shape by roll-up and pull-out operations of a motor and a roller (not shown).

Wireless tags for identification 5, 5, ... (hereinafter, referred to as location tags 5, 5, ... ) are aligned in a longitudinal direction on an upper surface of one of the supporting tables 7 at approximately equal intervals. The reader 2 for reading the location tags 5, 5, ... (hereinafter, in some instances represented as the location tag 5) and the wireless tags 3, 3, ... (hereinafter, in some instances represented as the wireless tag 3) placed on the belt 8 is set up at one end of the supporting table 7 on which the location tag 5 is mounted. The reader 2 functions also as a writer to write predetermined information, as well as reading the wireless tag 3 and the location tag 5.

Each of the location tags 5 arranged at equal intervals is referenced to determine the read range of the reader 2. The distance from the reader 2 to each location tag is stored in advance in the reader control device 1. Although location tag(s) 5 are described herein as having predetermined distance information and/or arranged at equal intervals, the present invention is not limited to a particular distance information or arrangement of location tag(s) 5. The imaging device 6 (hereinafter, the camera 6) is, for example, a digital camera. The camera 6 images the wireless tag 3 mounted on the articles 4, 4, ... (hereinafter, in some instances represented as the article 4) placed on the belt 8. Image data obtained by imaging is output to the reader control device 1. The field angle in the longitudinal direction of the supporting table 7 of the camera 6 is set in such a way that all the articles 4 on which the wireless tag 3 to be inspected is mounted can be imaged. More specifically, a field angle with which the belt 8 and the supporting table 7 from one end to the other can be imaged may be set.

In the present embodiment, an example in which eight wireless tags 3 mounted on eight articles 4 is taken for a description below. The reader control device 1 is, for example, a personal computer. The camera 6, the display part 14 such as a liquid crystal display, and the reader 2 are connected to the reader control device 1. The reader control device 1 is replaced by the computer 1 for a description below.

The article 4 in the present embodiment is, for example, a drug. The wireless tag 3 recognizable by image processing and indicated by hatching is mounted on an outer surface of the article 4. The article 4 is placed on the belt 8 with the mounting surface of the wireless tag 3 facing the camera 6 to allow image recognition of the wireless tag 3. The wireless tag 3 has a rectangular, circular, polygonal, star, or triangular shape in a plane view and has a color different from that of the article 4. In the present embodiment, description will be given of an example in which the rectangular wireless tag 3 colored in red is attached to the article 4 in white packaging placed on the black belt 8. The computer 1 recognizes a number of the wireless tags 3 from images captured by the camera 6 and, if this number and a number of the wireless tags 3 on the belt 8 read by the reader 2 do not match, changes the read range of the reader 2 by referencing the location tag 5 and references distance information of each wireless tag 3 obtained by image recognition before determining the failed wireless tag.

Figure 2:
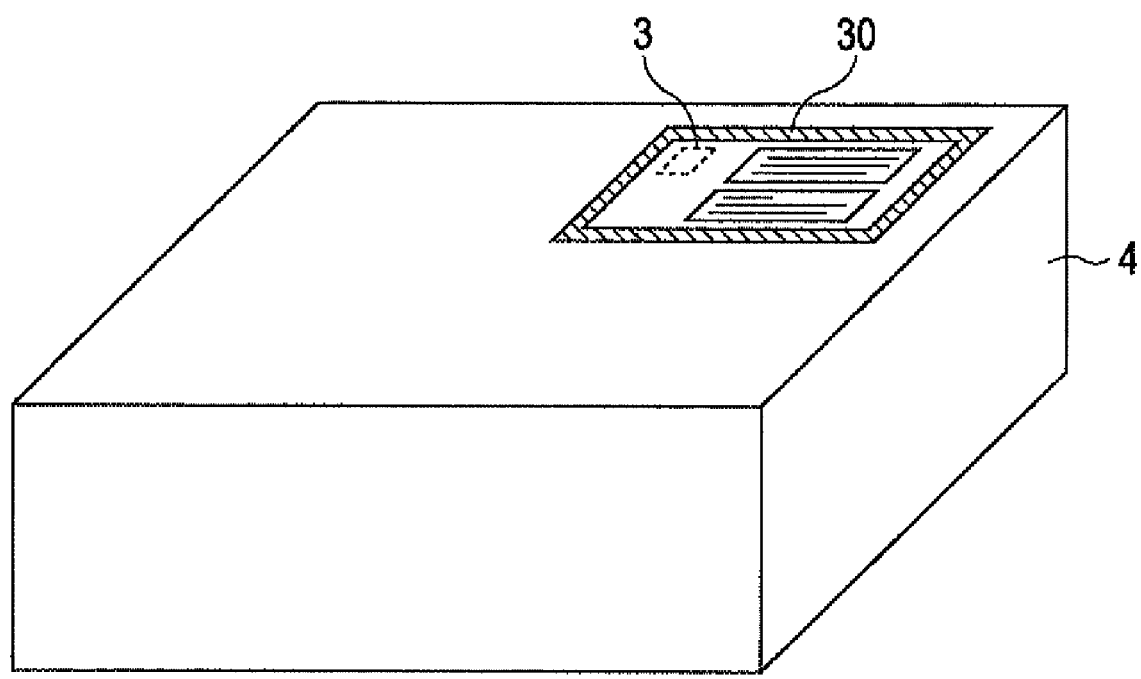
FIG. 2 is a schematic perspective view exemplifying a mounting body mounted on an article.

In the present embodiment, a mode in which the wireless tag 3 itself mounted on the article 4 is recognized by image recognition is described, but a mounting body on which the wireless tag 3 is mounted may be recognized. FIG. 2 is a schematic perspective view exemplifying a mounting body mounted on the article 4. An address label 30 in a rectangular plate shape to be a mounting body smaller than a surface area of an upper surface of the article 4 is attached to the upper surface of the article 4. The wireless tag 3 is embedded in the address label 30 whose upper surface has a field for address entry and the like. The address label 30 has a color (for example, green) different from that of the article 4 to be image recognizable or, as shown in FIG. 2, an outer circumferential edge has a color (for example, green) different from that of the article 4. Though a mode in which an image of the wireless tag 3 is recognized will be described below, the address label 30 may be recognized instead of the wireless tag 3 as shown in FIG. 2.

Figure 3:
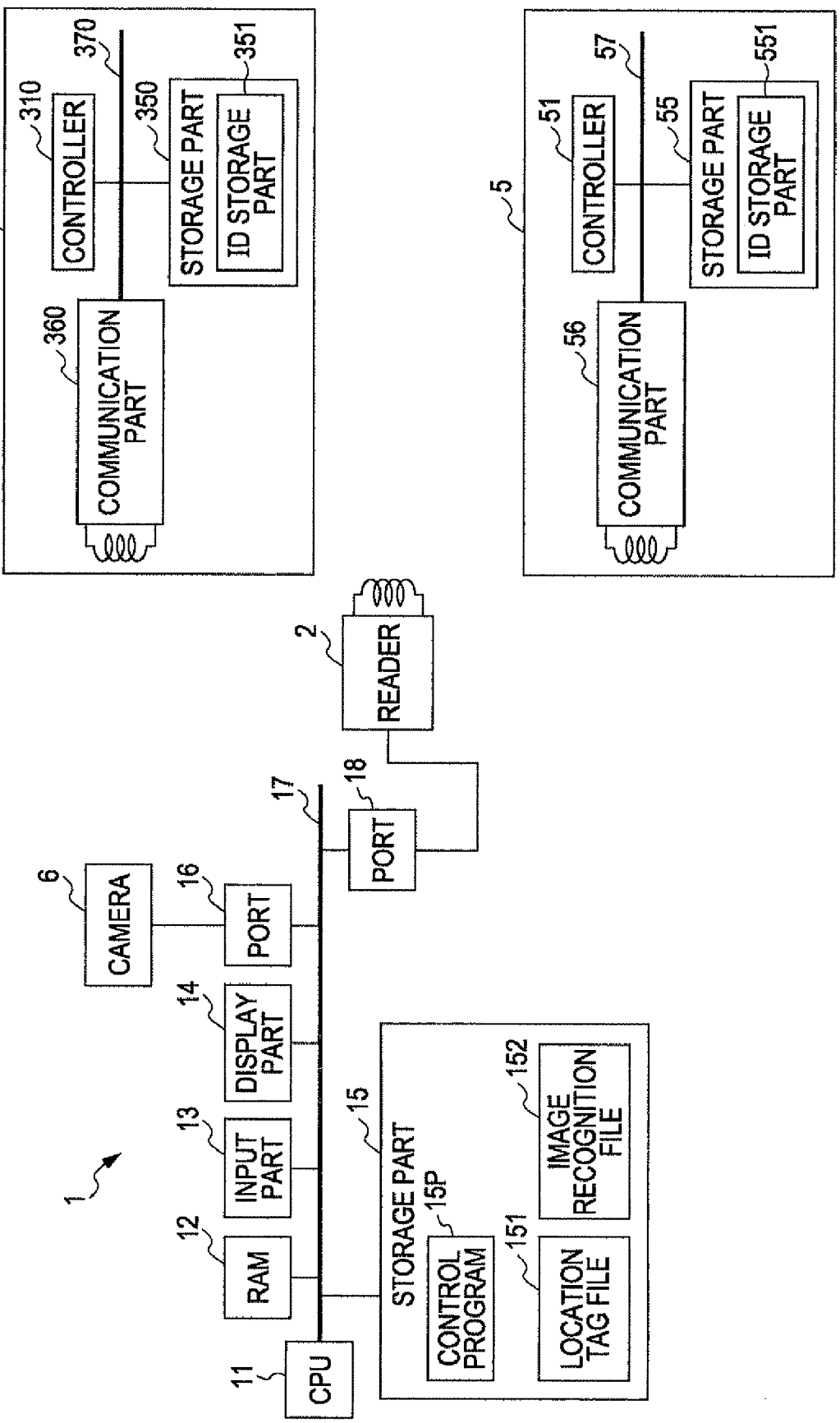
FIG. 3 is a block diagram showing a hardware configuration of a computer, a wireless tag, and a location tag.

FIG. 3 is a block diagram showing a hardware configuration of the computer 1, the wireless tag 3, and the location tag 5. The wireless tag 3 (not to be limited to this as long as means uses an identifier having a rewritable area such as an IC tag, RFID (Radio Frequency Identification), IC card, and rewritable bar code) includes a controller 310, a communication part 360, and a storage part 350. The controller 310 is constructed of logic circuits and the like to control the communication part 360 and the storage part 350 connected via a transmission line 370 according to an internal program. The communication part 360 is constructed of coils, RF circuits for radio communication and the like and transmits/receives identifiers (hereinafter, referred to as ID) uniquely attached to each of the wireless tags 3 and the like to/from the reader 2.

The storage part 350 is, for example, an EEPROM (Electronically Erasable and Programmable Read Only Memory), FeRAM (Ferroelectric Random Access Memory), or flash ROM. The storage part 35 contains an ID storage part 351. After receiving a read request from the reader 2, the controller 310 reads ID stored in the ID storage part 351 and transmits the read ID to the reader 2 via the communication part 360.

The location tag 5 has substantially the same configuration as that of the wireless tag 3 and includes a controller 51, a communication part 56, and a storage part 55. These components are mutually connected via a transmission line 57. An ID storage part 551 has identifiers (hereinafter, LID) uniquely attached to each of the location tags 5 stored therein. After receiving a read request from the reader 2, the controller 51 reads LID stored in the ID storage part 551 and transmits the read LID to the reader 2 via the communication part 56. If the location tag 5 is mounted on the supporting table 7, the storage part 55 may be caused by the reader 2 to store information of the distance of the location tag 5 from the reader 2 so that the stored distance is transmitted to the reader 2 together with LID when necessary.

The reader 2 reads the wireless tag 3 and the location tag 5 and outputs the read ID and LID to the computer 1 in accordance with control of the computer 1. The reader 2 can also increase or decrease the read range in a direction along the longitudinal direction of the supporting table 7 in accordance with control of the computer 1. This can be done, for example, by increasing or decreasing a voltage, current, or gain output to the reader 2 to increase/decrease a beam amplitude, thereby increasing/decreasing the read range. A mode in which the read range of the reader 2 is controlled by increasing/decreasing an output voltage value will be described below. The reader 2 is arranged at one end of the supporting table 7 facing the other end as a direction in which a beam is exited.

The computer 1 includes a CPU (Central Processing unit or part) 11 serving as a controller, a RAM 12, an input part 13, a display part 14, ports 16 and 18, and a storage part 15. The CPU 11 is connected to each part of hardware including the camera 6 and the reader 2 via a bus 17 to control these parts and executes various software functions including in accordance with a control program 15P stored in the storage part 15.

The display part 14 is, for example, a liquid crystal display and the input part 13 is formed of a keyboard, mouse, and the like. The storage part 15 is constructed, for example, of a hard disk and the above control program 15P, a location tag file 151, and an image recognition file 152 are stored therein. The ports 16 and 18 are, for example, USB (Universal Serial Bus) ports and connected to the camera 6 and the reader 2 via a USB cable, respectively.

FIG. 4 is an explanatory diagram showing a record layout of the location tag file 151. The location tag file 151 includes an LID field, a distance field, and an output voltage value field. Corresponding to each LID, the location tag file 151 has information the distance from the reader 2 arranged at one end of the supporting table 7 to each of the location tags 5 placed on the supporting table 7 and the output voltage value output to the reader 2 stored therein. An identifier (LID) of the location tag 5 is stored in the LID field. LID is stored in ascending order of distance of the location tag 5 from the reader 2 like L01, L02, L03, ... L30. Information of the distance from the reader 2 is stored in the distance field by associating with LID. For example, the location tag 5 of L01 arranged at one end of the supporting table 7 is arranged 10 cm apart from the reader 2 and the location tag 5 of L02 arranged next to L01 in a receding direction is arranged 20 cm apart from the reader 2. The location tag 5 of L30 arranged at the other end of the supporting table 7 is arranged 300 cm apart from the reader 2.

The information of the distance is input by a user by associating with LID from the input part 13. The CPU 11 stores the input LID and the distance in the location tag file 151 of the storage part 15. The unit of the output voltage field is v and an output voltage value needed for the reader 2 to read each location tag 5 is stored therein. For example, the location tag 5 whose LID is L01 requires the output voltage of v1 and the location tag 5 whose LID is L02 located farther apart than L01 requires the output voltage of v2, which is greater than v1.

The CPU 11 gradually increases the output voltage value output to the reader 2 from a minimum output voltage (for example, 0 v). The reader 2 references the output voltage value output from the computer 1 to increase an applied voltage. This increase in voltage increases the read range so that the location tag 5 can be read. Each time one location tag 5 is completely read through the reader 2, the CPU 11 sequentially stores the output voltage value at that time in the location tag file 151 by associating with LID output from the reader 2. The read range of the reader can thereby be controlled with high precision by using a plurality of location tags 5 whose distance from the reader 2 is known (or predetermined). An example in which the location tag 5 is placed at intervals of 10 cm is described in the present embodiment, but the interval may be any appropriate value in accordance with a size of articles and the like. Because the location tag 5 may fail, the location tag 5 should periodically be verified by the reader 2 to insure that the location tag 5 is operating normally. If the location tag 5 fails, the concerned LID and the related distance stored in the location tag file 151 may be deleted until the new location tag 5 is placed.

Figure 5:
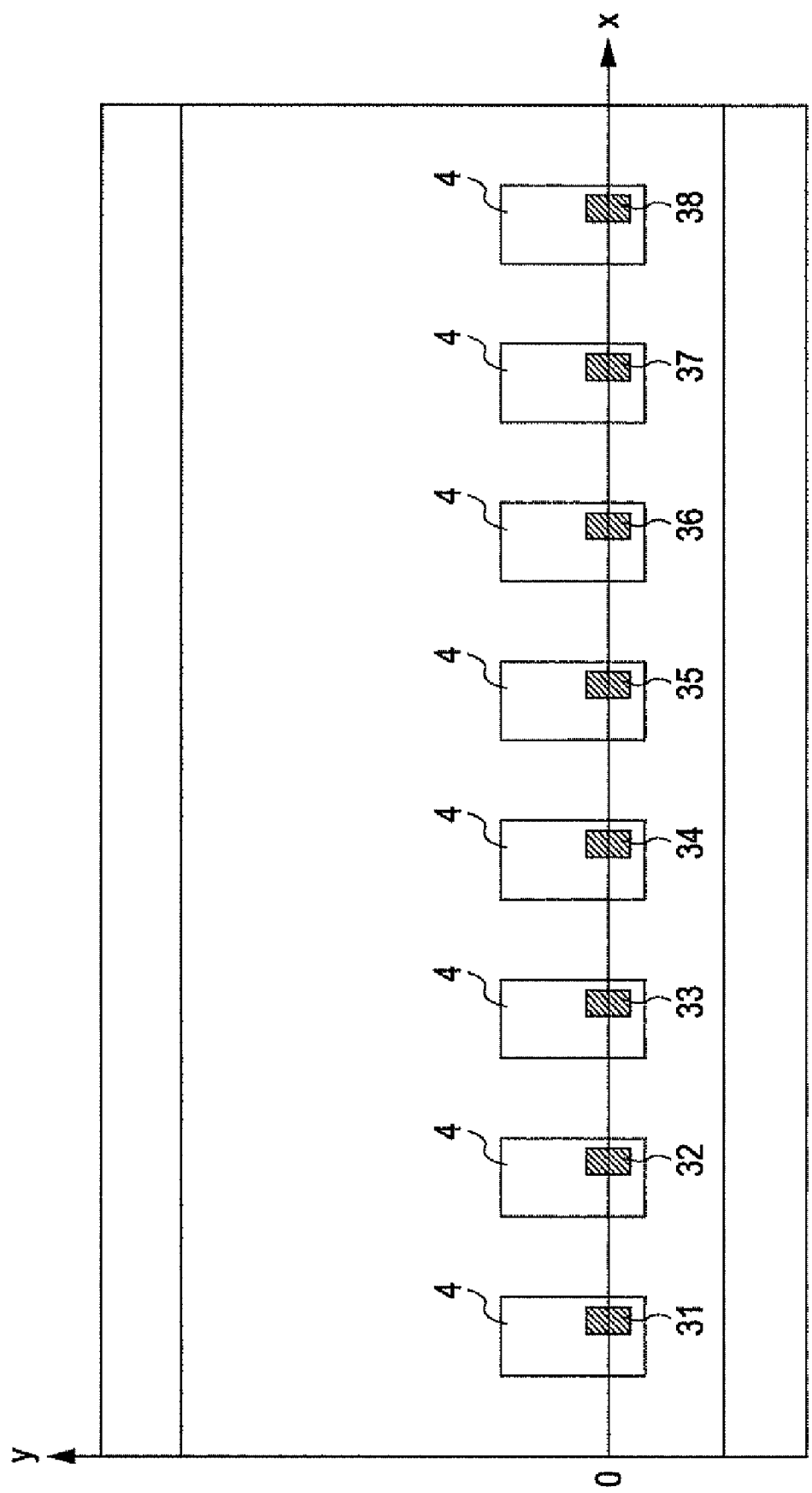
FIG. 5 is an explanatory diagram showing an appearance of an image captured by a camera.

FIG. 5 is an explanatory diagram showing an appearance of an image captured by the camera 6. An image captured by the camera 6 is output to the computer 1. As shown in FIG. 5, the CPU 11 of the computer 1 displays the captured image in the display part 14. The CPU 11 of the computer 1 extracts data of the wireless tag 3 through image recognition to acquire position information. More specifically, the CPU 11 reads out a template image with the same color and shape as those of the wireless tag 3 stored in the storage part 15 in advance, calculates the number of the wireless tags 3, 3, . . . by pattern matching or edge detection, etc., and extracts coordinate values at which the wireless tags 3, 3, . . . are present. Coordinate values are based on the x axis taken in the longitudinal direction of the supporting table 7 and the y axis taken in an intersecting direction thereof. The receding direction on the x axis from the reader 2 is defined as the positive x axis direction and the direction from the 6 o'clock position to the 12 o'clock position in a plane view is defined as the positive y axis direction. The reader 2 is placed at one end of the supporting table 7 corresponding to the x axis value 0 with the emission direction of beam directed toward the positive x axis direction.

The coordinate value corresponds to a pixel of a captured image. To make the description easier, it is assumed in the present embodiment that the articles 4, 4, . . . are aligned approximately in parallel on a straight line at y=0 and x coordinate values of eight wireless tags 31 to 38 attached to these articles are read. The read x coordinate value of the wireless tag 3 may be an average value of the coordinate value of a left edge and that of a right edge of the wireless tag 3. The CPU 11 has the distance per pixel (per coordinate value) stored in the storage part 15 in advance and calculates the distance between the reader 2 and each of the wireless tags 31 to 38 by multiplying the x coordinate value of each wireless tag 3 by the distance per coordinate value. The CPU 11 stores the calculated distance in the image recognition file 152. Though an example in which the distance between the reader 2 and the wireless tag 3 is used as distance information is described in the present embodiment, coordinate values of the reader 2 and each wireless tag 3 may also be used as distance information. The arrangement interval of each wireless tag 3 is assumed to be sufficiently larger than the installation interval of each location tag 5.

FIG. 6 is an explanatory diagram showing a record layout of the image recognition file 152. The image recognition file 152 has distance information associated with each image number stored therein. The image number is a number for identifying each wireless tag 3 recognized by the CPU 11 through image processing. The CPU 11 assigns an image number to each wireless tag 3 recognized in ascending order of x coordinate value and stores the assigned image number in the image recognition file 152. In the present example, image numbers 1 to 8 corresponding to the wireless tags 31 to 38 (FIG. 5) are stored. The distance from the reader 2 to each wireless tag 3 obtained through image recognition is stored in the distance field. For example, the wireless tag 31 corresponding to the image number 1 is shown to be present 31 cm apart from the reader 2.

The CPU 11 causes the output voltage of the reader 2 to increase to its maximum value of 30 v in order to read all the location tags 5 present from one end to the other end of the supporting table 7. The CPU 11 determines whether or not a number of IDs of the wireless tag 3 output from the reader 2 and a maximum number of the image number stored in the image recognition file 152 match. If both the numbers match, the CPU 11 determines that all the wireless tags 3 are operating normally and controls a belt driving part (not shown) to cause the belt to rotate eight times. Then, the CPU 11 newly inspects the wireless tag 3.

If the number of IDs of the wireless tag 3 output from the reader 2 and the maximum number of the image number stored in the image recognition file 152 do not match, the CPU 11 causes the output voltage of the reader 2 to increase or decrease, that is, the read range of the reader 2 to increase or decrease to determine the wireless tag 3 whose reading has failed. In the example described below, it is assumed that a failure occurred in the wireless tag 36. The CPU 11 references the image recognition file 152 and causes the output voltage of the reader 2 to decrease in order to make a distance that is shorter than the distance 240 cm corresponding to the image number 8 by a predetermined length (for example, 10 cm) the read range. In the present example, the output voltage is set to 23 v. In this case, the CPU 11 determines whether or not the number of IDs read by the reader 2 has decreased by 1. In the present example, whether or not the number of IDs has decreased from 7 to 6 is determined. If the number of IDs has decreased by 1, the CPU 11 determines that the wireless tag 38 is operating normally.

Next, the CPU 11 verifies the wireless tag 37. The CPU 11 references the image recognition file 152 and causes the output voltage of the reader 2 to decrease in order to make a distance that is shorter than the distance 210 cm corresponding to the image number 7 by the predetermined length (10 cm) the read range. In the present example, the output voltage is set to 20 v. In this case, the CPU 11 determines whether or not the number of IDs read by the reader 2 has decreased by 1. In the present example, whether or not the number of IDs has decreased from 6 to 5. If the number of IDs has decreased by 1, the CPU 11 determines that the wireless tag 37 is operating normally.

Next, the CPU 11 verifies the wireless tag 36. The CPU 11 references the image recognition file 152 and causes the output voltage of the reader 2 to decrease in order to make a distance that is shorter than the distance 180 cm corresponding to the image number 6 by a predetermined length (for example, 10 cm) the read range. In the present example, the output voltage is set to 17 v. In this case, the CPU 11 determines whether or not the number of IDs read by the reader 2 has decreased by 1. Since the wireless tag 36 has failed in the present example, the number of IDs does not decrease and remains at 5. The number of IDs has not decreased and therefore, the CPU 11 determines that the wireless tag 36 corresponding to the image number 6 is the failed wireless tag.

Figure 7:
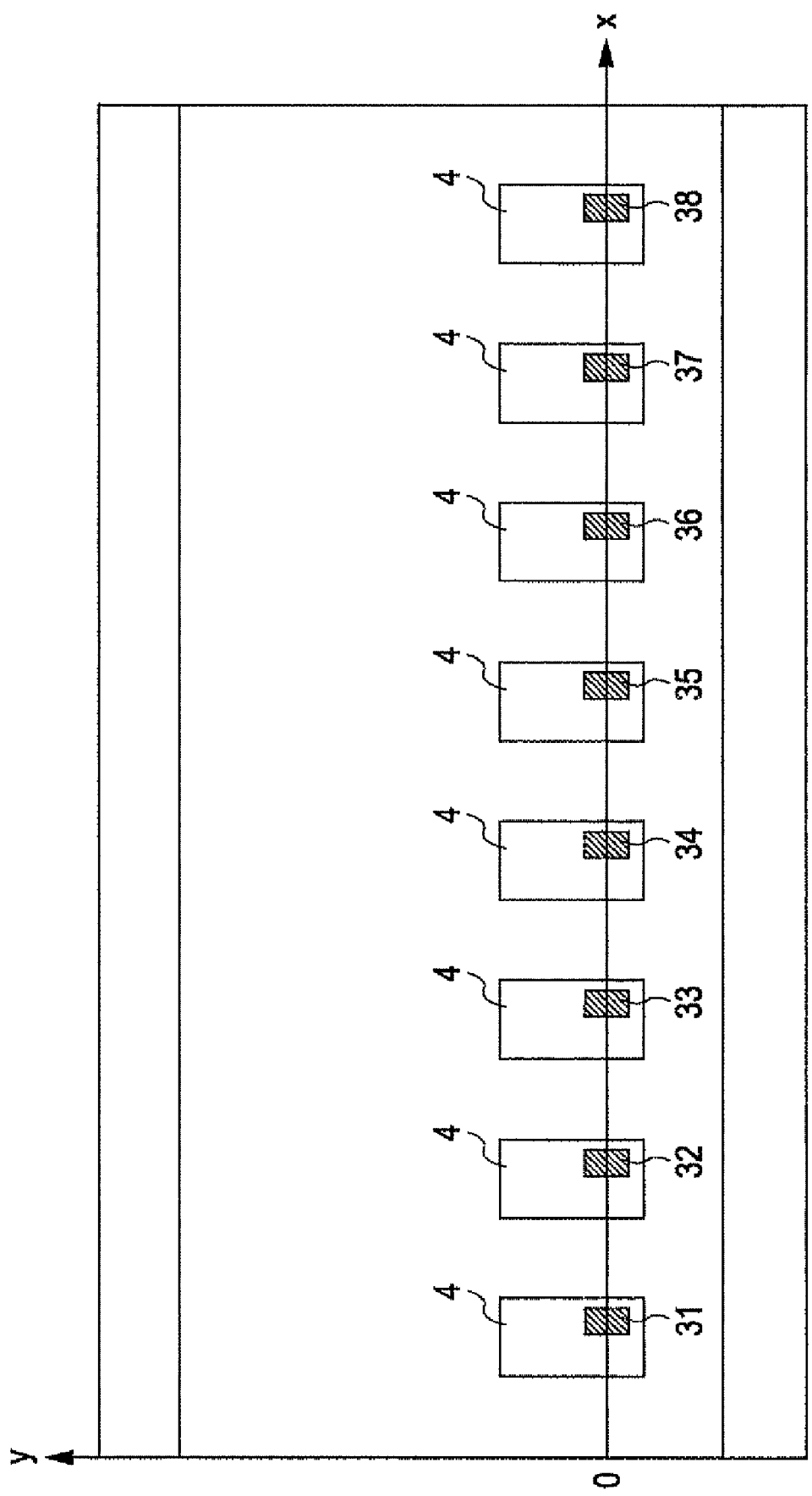
FIG. 7 is an explanatory diagram showing a resultant output image.

FIG. 7 is an explanatory diagram showing a resultant output image. If it is determined that the wireless tag 36 has failed, the CPU 11 references the image recognition file 152 to read the distance corresponding to the image number 6. Then, the CPU 11 calculates the x coordinate value of the wireless tag 36 by dividing a read distance by a length per pixel. The CPU 11 reads image information indicating that a failure occurred near the calculated coordinate value from the storage part 15 and displays the image in the display part 14 as shown in FIG. 7. The image information may be displayed, for example, in a color (for example, blue) different from that (red) of the wireless tag 3. As shown in FIG. 7, a blue rectangular image, which is the image information, is displayed in an image area of the wireless tag 36. Or, an image corresponding to the image number (6 in the present example) stored in the storage part 15 may be displayed with the calculated coordinate value as its center. For example, the number 6 in blue may be displayed in the image area of the wireless tag 36. Though a mode in which one unit of the camera 6 is used is adopted in the present embodiment, a plurality of cameras 6 may be used. If a plurality of pieces of image data are obtained from the plurality of cameras 6, the image data may be synthesized to produce one piece of image data before being used. Moreover, a zoom function of the camera 6 may be used to determine the field angle of the camera 6.

Figure 8:
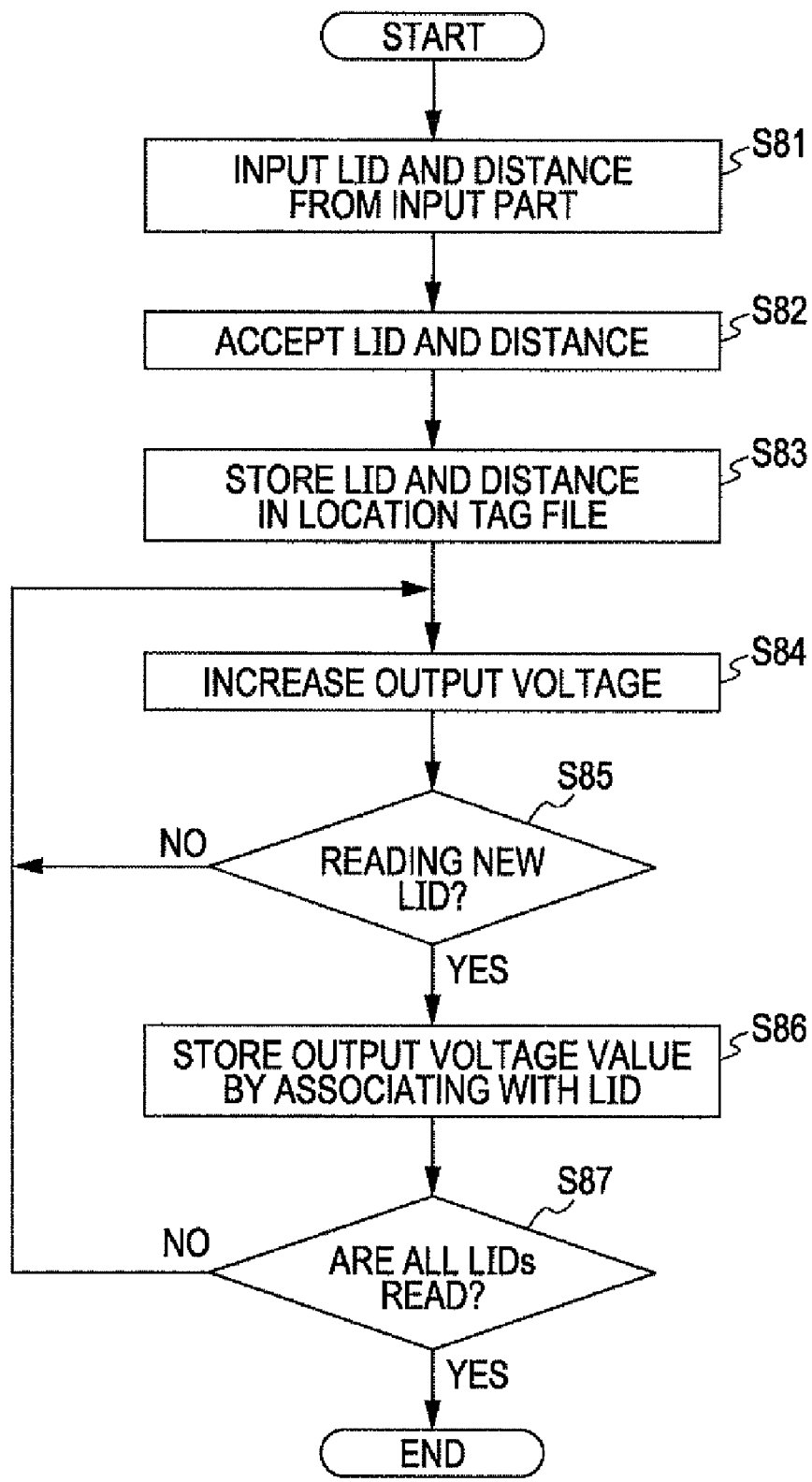
FIG. 8 is a flow chart showing a procedure for determination processing of an output voltage to each location tag.

The procedure for each processing in the above hardware configuration will be described in detail using flow charts. FIG. 8 is a flow chart showing a procedure for a determination processing of an output voltage to each location tag 5. A user inputs LID of each location tag 5 and the distance from the reader 2 from the input part 13 (operation S81). The CPU 11 accepts the LID and distance input from the input part 13 (operation S82) and stores the accepted LID and distance in the location tag file 151 by associating the LID and distance (operation S83). The CPU 11 gradually increases the output voltage value to the reader 2 from 0 v (operation S84). For example, the output voltage value may be increased in increments of 0.5 v. Here, the CPU 11 determines whether or not any new LID has been read by the reader 2 (operation S85).

If a new LID is not read (NO at operation S85), the CPU 11 moves back to operation S84 to increase the output voltage. If, on the other hand, the CPU 11 determines that a new LID has been read (YES at operation S85), the CPU 11 stores the output voltage value in the location tag file 151 by associating with the new LID (operation S86). The CPU 11 determines whether all the LIDs stored in the location tag file 151 have been read (operation S87). If the CPU 11 determines that not all the LIDs have been read (NO at operation S87), the CPU 11 moves back to operation S84 to repeat storage of the output voltage value for another new LID. If the CPU 11 determines that all the LIDs have been read (YES at operation S87), on the other hand, the CPU 11 terminates a sequence of processing.

Figure 9:
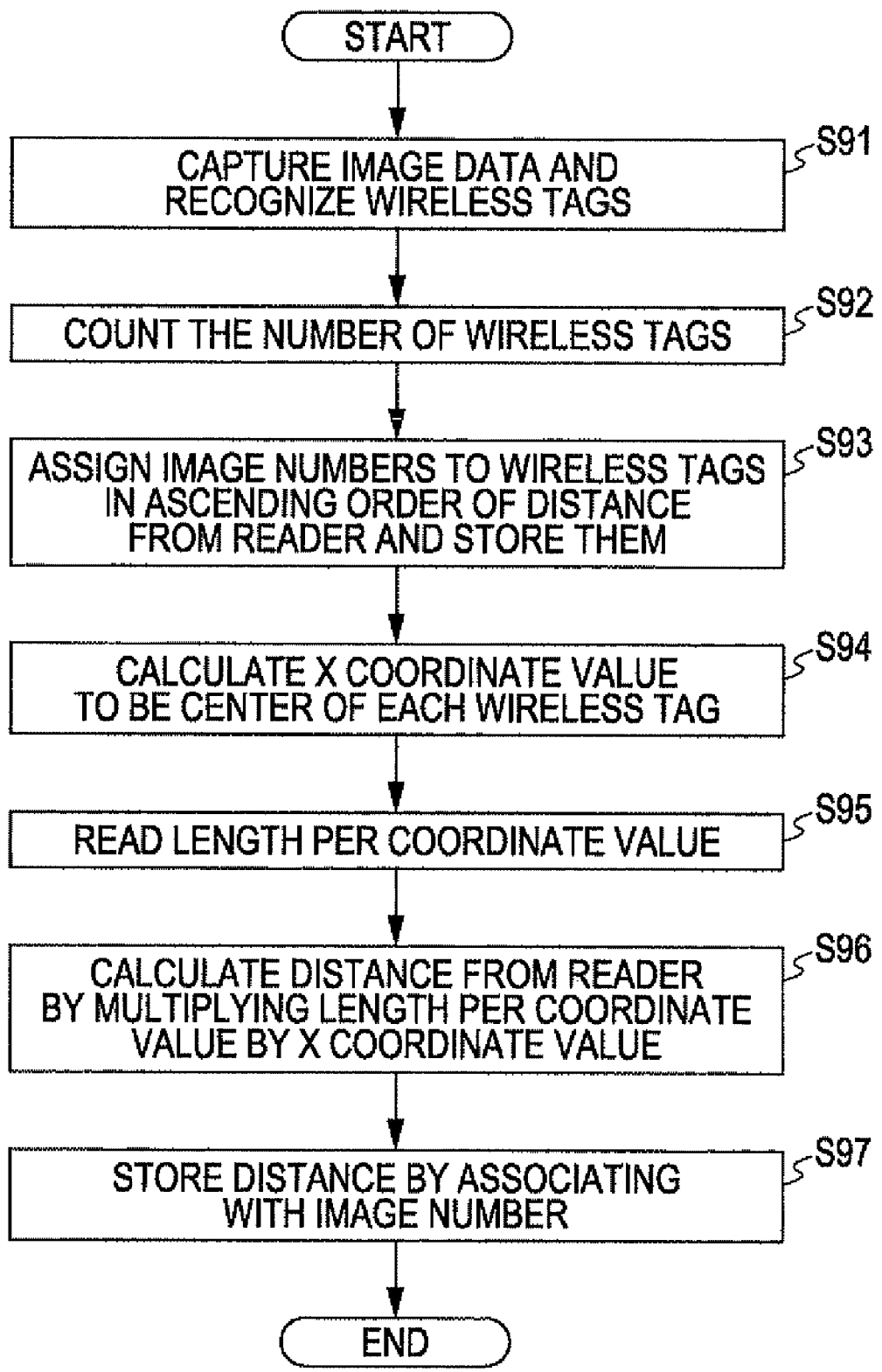
FIG. 9 is a flow chart showing a procedure for calculating a number of wireless tags and a distance from a reader.

FIG. 9 is a flow chart showing a procedure for calculating a number of the wireless tags 3 and a distance from the reader 2. The CPU 11 captures image data from, for example, the camera 6 to recognize each wireless tag 3 (operation S91). The CPU 11 counts the number of the recognized wireless tags 3 (operation S92). This processing may be performed, as described above, by pattern matching based on the color or shape of the wireless tag 3 stored in the storage part 15 in advance or edge detection, etc. The CPU 11 assigns an image number to each wireless tag 3 in ascending order of distance from the reader 2 and stores the assigned image numbers, as shown in FIG. 6, in the image recognition file 152 (operation S93).

The CPU 11 calculates the x coordinate value to be the center of each wireless tag 3 (operation S94). The CPU 11 reads the length per coordinate value from the storage part 15 (operation S95) and multiplies the length per coordinate value by the x coordinate value of each wireless tag 3 calculated at operation S94 to calculate the distance from the reader 2 to each wireless tag 3 (operation S96). The CPU 11 stores the calculated distance in the image recognition file 152 by associating with the image number (operation S97).

Figure 10:
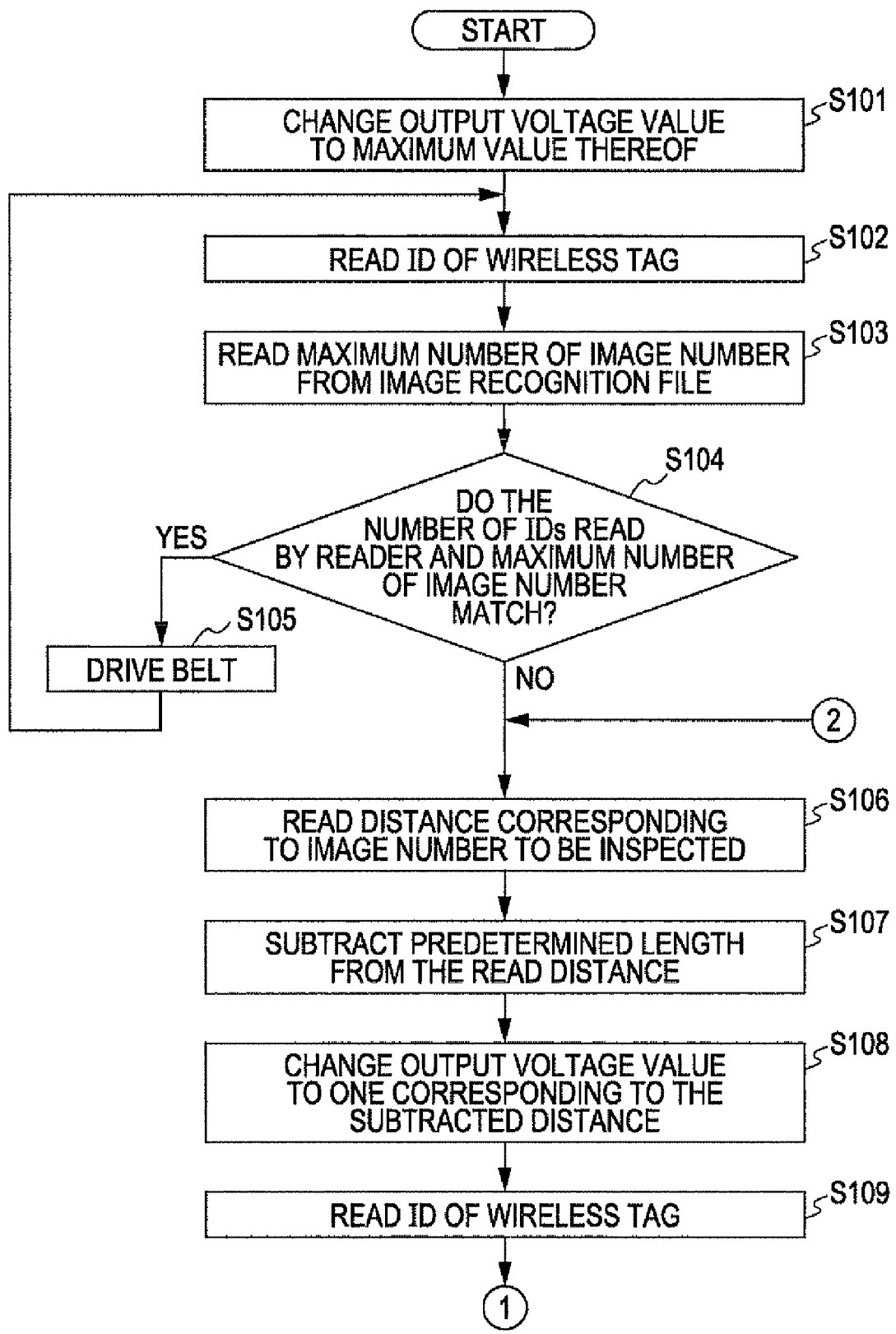
FIG. 10 is a flow chart showing a procedure for determining a failed wireless tag.
Figure 11:
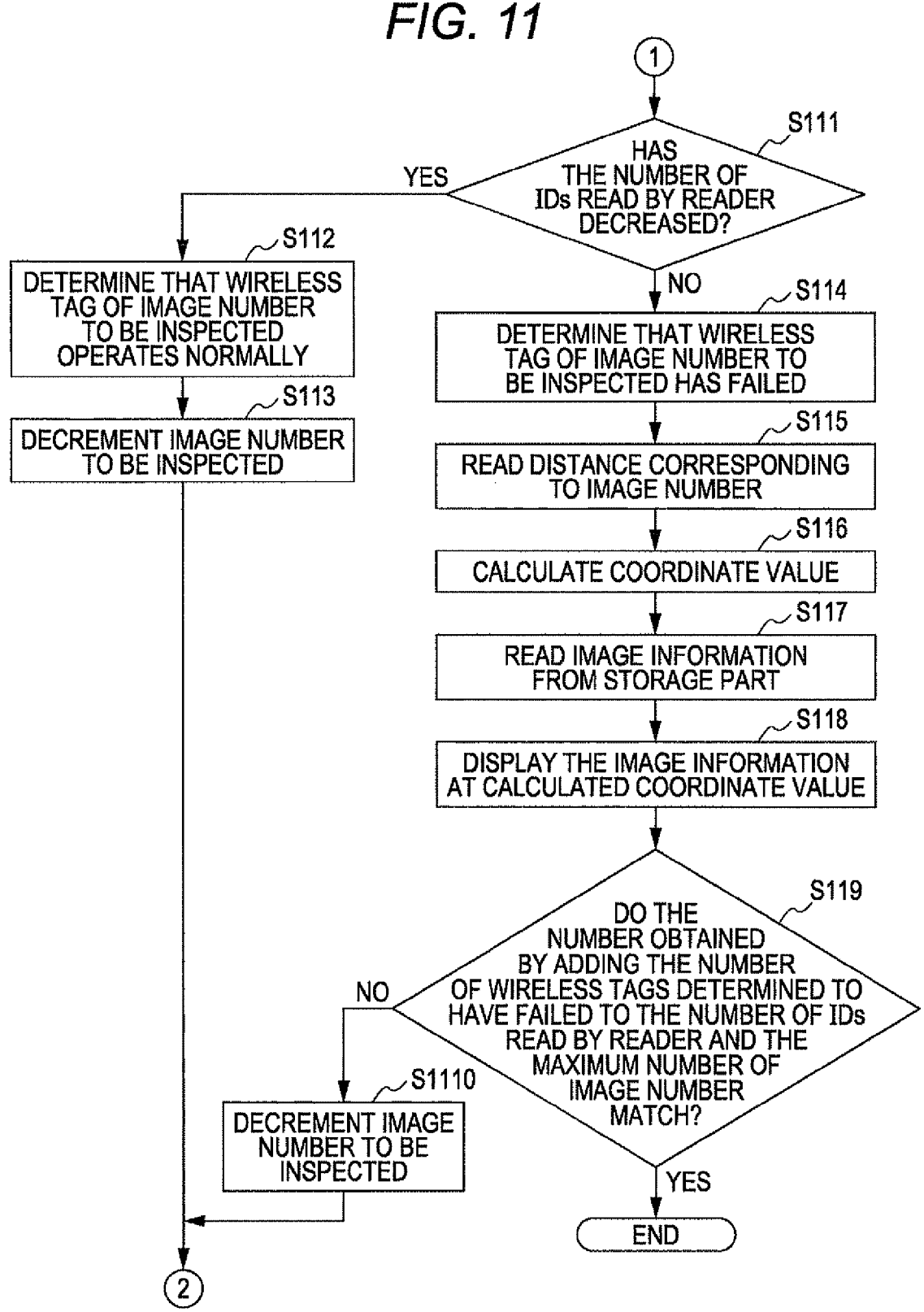
FIG. 11 is a flow chart showing a procedure for determining a failed wireless tag.

FIGS. 10 and 11 are flow charts showing a procedure for determining a failed wireless tag. First, the CPU 11 references the location tag file 151 to change the output voltage value to its maximum value in order to maximize the read range of the reader 2 (operation S101). Accordingly, all the areas in which the wireless tags 31 to 38 (FIG. 5) are present become within the read range. The reader 2 reads ID of the wireless tag 3 (operation S102). The read ID of the wireless tag is output to the CPU 11. The CPU 11 reads the maximum number of the image number obtained from the image recognition file 152 by image recognition (operation S103).

The CPU 11 determines whether or not the number of IDs read at operation S102 by the reader 2 and the maximum number of the image number read at operation S103 match (operation S104). If the CPU 11 determines that both the numbers match (YES at operation S104), the CPU 11 determines that all the wireless tags 3 are operating normally and outputs a belt driving signal to a belt driving part (not shown). The belt 8 is thereby driven (operation S105) and a plurality of new wireless tags 3 to be inspected are carried. The CPU 11 brings processing back to operation S102.

If, on the other hand, the CPU 11 determines that both the numbers do not match (NO at operation S104), the CPU 11 reads the distance corresponding to the image number to be inspected from the image recognition file 152 (operation S106). If the wireless tag 38 is to be inspected, the distance 240 cm corresponding to this is read. The CPU 11 performs processing to subtract a predetermined length from the read distance (operation S107). The predetermined length may be used by reading a value (for example, 10 cm) stored in the storage part 15 in advance. The CPU 11 reads the output voltage value corresponding to the subtracted distance by referencing the location tag file 151 and changes the output voltage value to this read one (operation S108).

In addition, instead of subtraction processing at operation S107, the output voltage value may be calculated based on a distance corresponding to a plurality of image numbers stored in the image recognition file 152 to prevent an influence due to strength in sensitivity inherent in the wireless tag 3. More specifically, an average value of distance between adjacent image numbers may be calculated to read the output voltage value corresponding to the calculated distance from the location tag file 151. For example, the distance of the image number 8 is 240 cm and that of the image number 7 is 210 cm and thus, the average value to be a predetermined value will be 225 cm. The CPU 11 changes the output voltage value to one corresponding to this average value.

The reader 2 reads ID of the wireless tag 3 at the changed output voltage value (operation S109). The read ID is output from the reader 2 to the CPU 11. The CPU 11 determines whether or not the number of IDs read by the reader 2 has decreased compared to the number of Ids before the output voltage value is changed at operation S108 (operation S111). If the CPU 11 determines that the number of IDs read by the reader 2 has decreased (YES at operation S111), the CPU 11 determines that the wireless tag 3 of the image number to be inspected is operating normally (operation S112). The CPU 11 stores a flag indicating normal operation in the image recognition file 152 by associating with the image number.

Subsequently, the CPU 11 decrements the image number to be inspected to verify the wireless tag 3 whose image number is smaller by 1 (operation S113). The CPU 11 brings processing back to operation S106 to repeat the processing. If, on the other hand, the CPU 11 determines that the number of IDs read by the reader 2 has not decreased (NO at operation S111), the CPU 11 determines that the wireless tag 3 of the image number to be inspected has failed (operation S114). The CPU 11 stores a flag indicating a failure in the image recognition file 152 by associating with the image number.

The CPU 11 references the image recognition file 152 to read the distance corresponding to the image number (operation S115). The CPU 11 reads the distance per coordinate value stored in the storage part 15 and calculates the coordinate value of the failed wireless tag by dividing the distance read at operation S115 by the distance per coordinate value (operation S116). The CPU 11 reads image information stored in the storage part 15 to indicate the location of the wireless tag 3 (operation S117). The CPU 11 displays the image information read at operation S117 in the display part 14 with the coordinate value calculated at operation S116 as its center (operation S118). In addition to displaying the failed wireless tag in the display part 14 using image information, a notification may be made by voice using a speaker (not shown). For example, a notification may be output from a speaker by combining voice guidance stored in the storage part 15 with the image number of the wireless tag 3 determined at operation S114. Voice such as "The sixth wireless tag from the reader has failed." may be output.

The CPU 11 determines whether or not the number obtained by adding the number of IDs read by the reader 2 at operation S102 and the number of the wireless tags 3 determined to have failed at operation S114 and the maximum number of images match (operation S119). If the numbers do not match (NO at operation S119), the CPU 11 determines that there may still be other wireless tags 3 that have failed and decrements the image number to be inspected (operation S1110) before bringing processing back to operation S106. Then, determination processing of the failed wireless tag proceeds by repeating the above processing. If, on the other hand, the CPU 11 determines at operation S119 that both the numbers match (YES at operation S119), a sequence of processing terminates assuming that all the failed wireless tags have been determined. The present embodiment describes a mode in which whether or not ID of the wireless tag 3 is readable is verified by causing the output voltage value to gradually decrease. However, whether or not ID of the wireless tag 3 is readable may be verified by causing the output voltage value to gradually increase.

Figure 12:
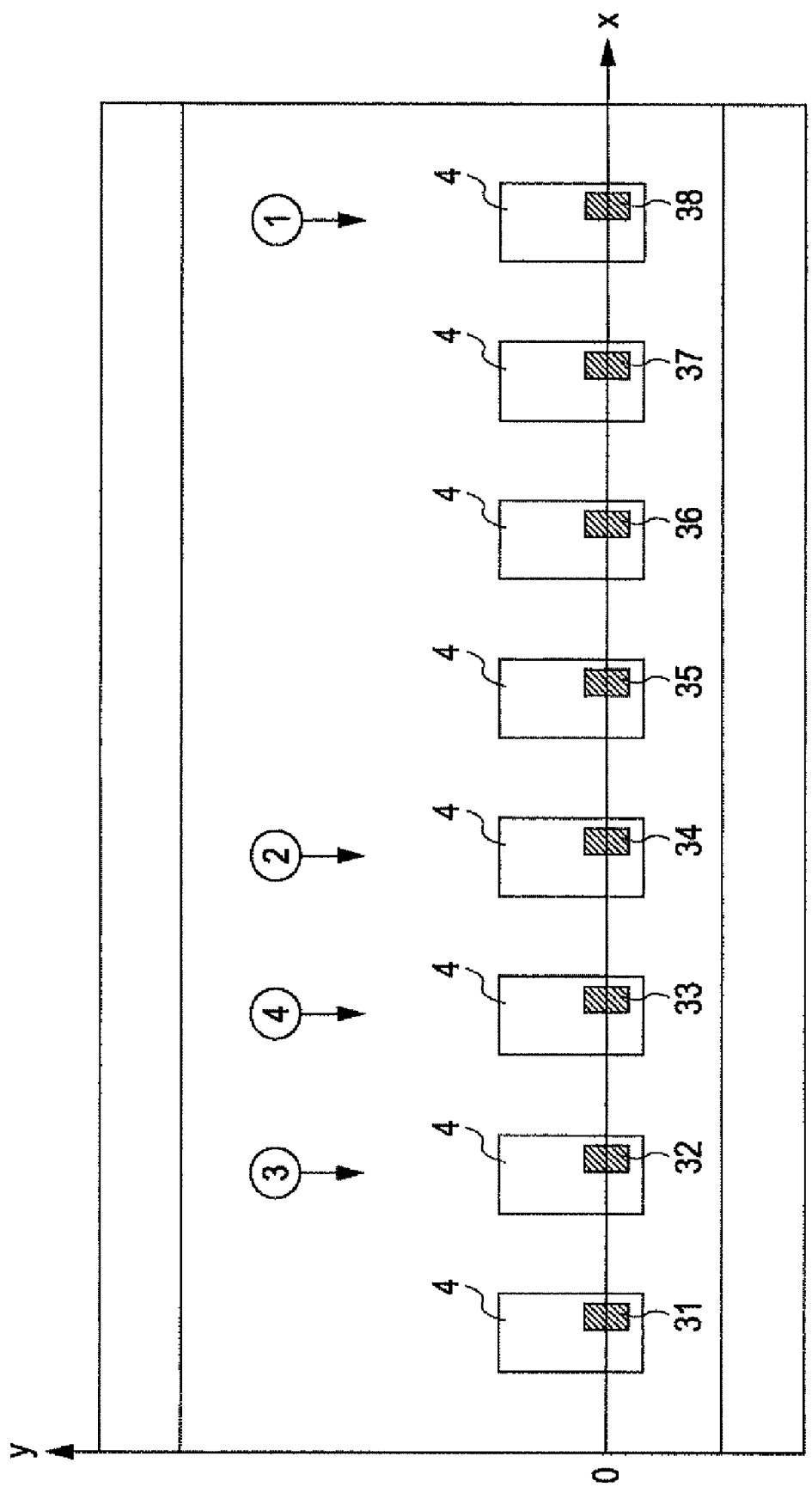
FIG. 12 is an explanatory diagram showing a procedure for determination processing using a divide and rule method.

An embodiment relates to a method of determining the failed wireless tag by the divide and rule method. FIG. 12 is an explanatory diagram showing a procedure for determination processing using the divide and rule method. In the divide and rule method, a range to be inspected of the wireless tag 3 is reduced by half. That is, the read range of the reader 2 is reduced by half by the divide and rule method, or the range corresponding to the reduced half is further added. By reducing the range to be inspected by half, the failed wireless tag can efficiently be determined. It is assumed in the present embodiment that the failed wireless tag is the wireless tag 33. The CPU 11 reads the distance corresponding to the image number 8 from the image recognition file 152. The CPU 11 reads the output voltage value corresponding to the read distance from the location tag file 151. The reader 2 reads IDs. Since the wireless tag 33 has failed, the number of IDs is 7. This is a first verification.

The CPU 11 divides the maximum image number by 2 to calculate the image number 4. The CPU 11 reads the distance corresponding to the image number 4 from the image recognition file 152. The CPU 11 reads the output voltage value corresponding to the read distance from the location tag file 151. The reader 2 reads IDs. Since the wireless tag 33 has failed, the number of IDs does not match the image number 4 and becomes 3. Thus, it is understood that the failed wireless tag is present among the wireless tags 31 to 34 and the wireless tags 35 to 38 are operating normally. This is a second verification.

The CPU 11 divides the image number 4 by 2 to calculate the image number 2. The CPU 11 reads the distance corresponding to the image number 2 from the image recognition file 152. The CPU 11 reads the output voltage value corresponding to the read distance from the location tag file 151. The reader 2 reads IDs. Since the wireless tag 33 has failed, the number of IDs matches the image number 2. Thus, it is understood that the failed wireless tag is present between the wireless tags 33 and 34 and the wireless tags 31 and 32 are operating normally. This is a third verification.

The CPU 11 divides the image number 2 by 2 to calculate the image number 1 as the final determination processing. Then, the CPU 11 adds the image number 1 to the image number 2 to calculate the image number 3 to increase the read range. The CPU 11 reads the distance corresponding to the image number 3 from the image recognition file 152. The CPU 11 reads the output voltage value corresponding to the read distance from the location tag file 151. The reader 2 reads IDs. Since the wireless tag 33 has failed, the number of IDs remains at 2. Thus, it is understood that the wireless tag 33 is the failed wireless tag and the wireless tag 34 is operating normally. This is a fourth verification. If the number of the articles 4 is odd, an inspection by the divide and rule method according to this embodiment may be carried out after completing an inspection of one wireless tags 3 as described in the above embodiment.

Figure 13:
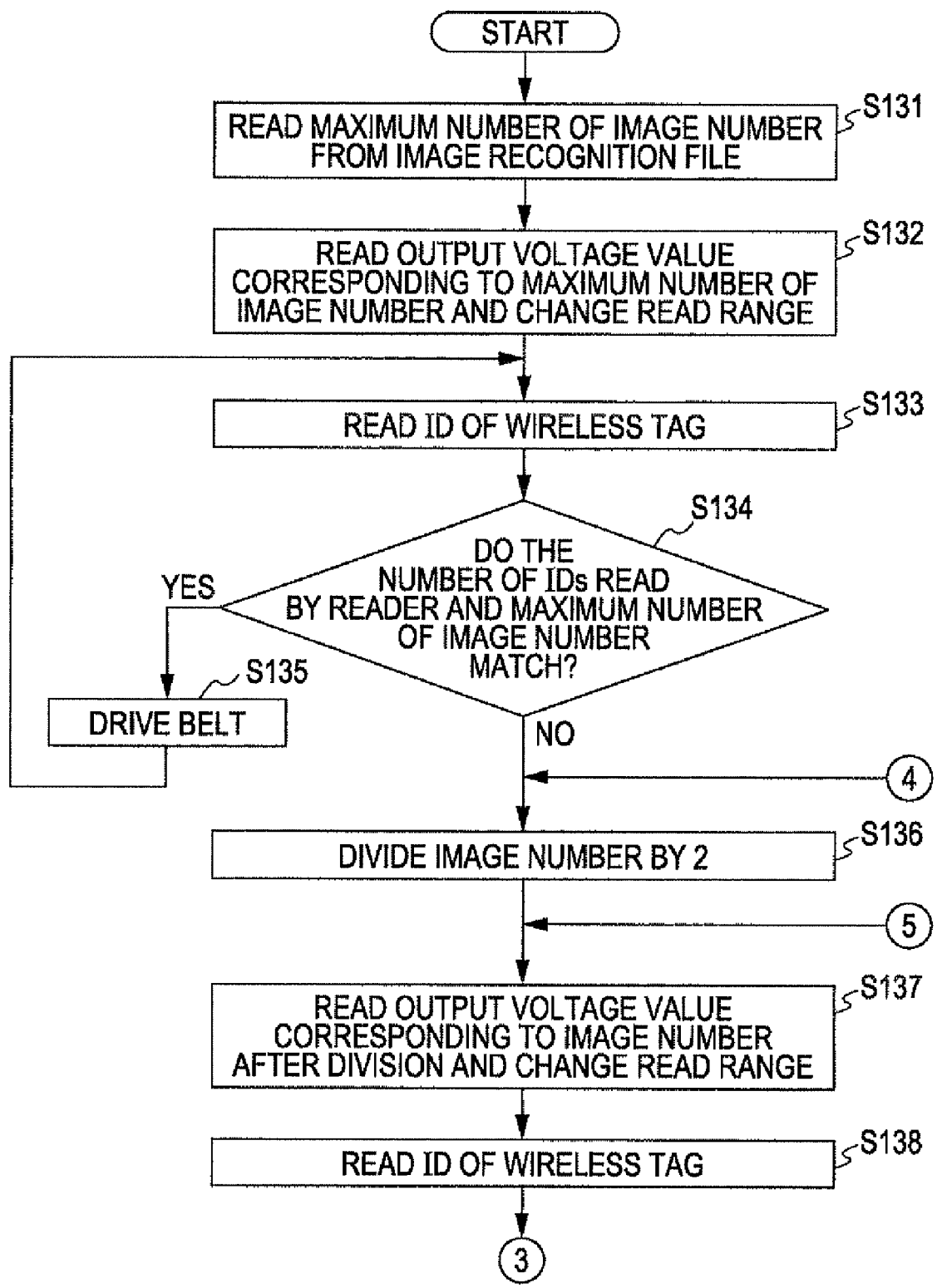
FIG. 13 is a flow chart showing a procedure for determination processing using the divide and rule method.
Figure 14:
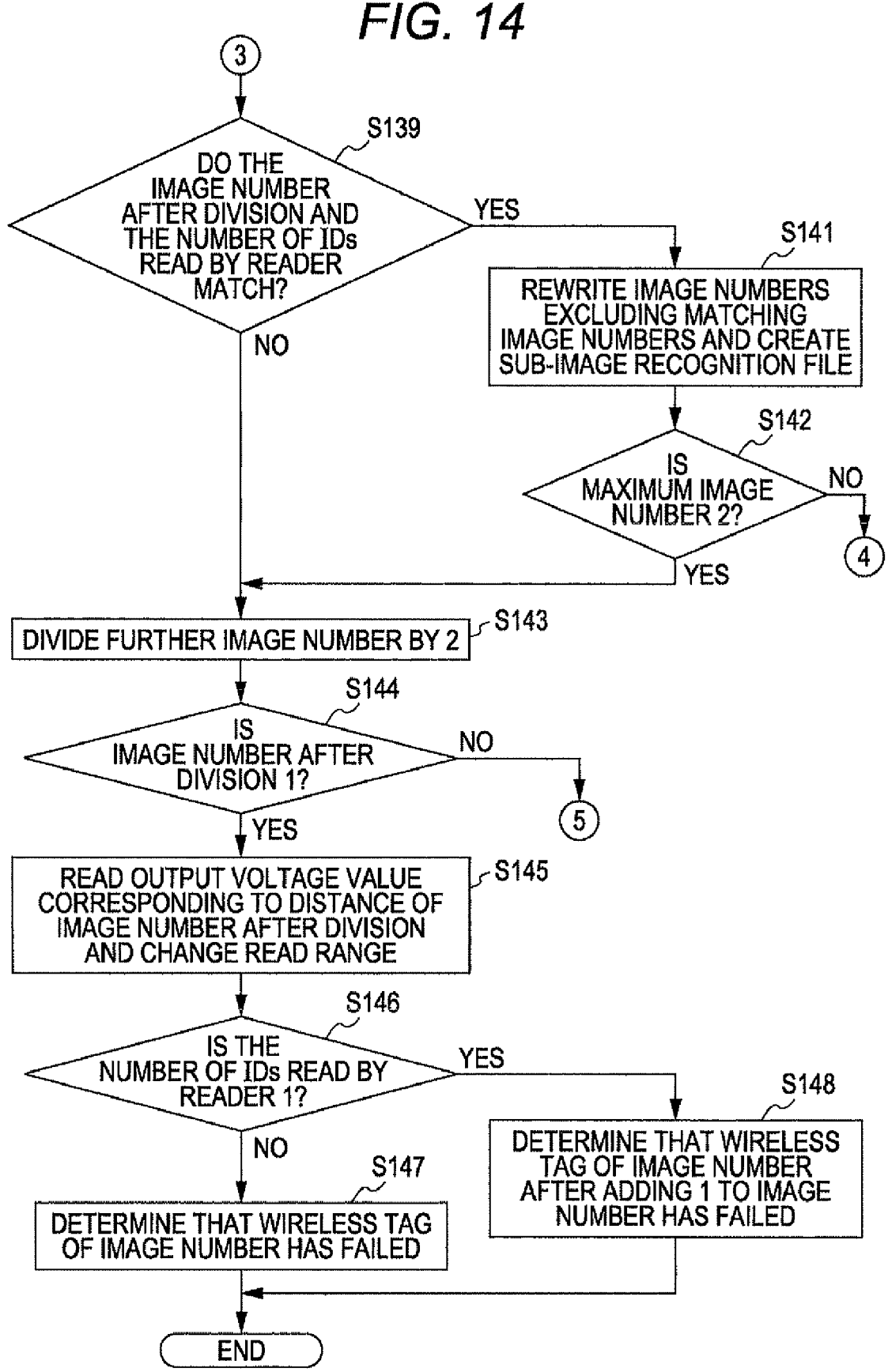
FIG. 14 is a flow chart showing a procedure for determination processing using the divide and rule method.

FIGS. 13 and 14 are flow charts showing a procedure for determination processing using the divide and rule method. First, the CPU 11 reads the maximum number of the image number from the image recognition file 152 (operation S131). The CPU 11 reads the output voltage corresponding to the maximum number of the image number by referencing the location tag file 151 and changes the read range (operation S132). The reader 2 reads IDs of the wireless tag 3 (operation S133). The read wireless tag IDs are output to the CPU 11.

The CPU 11 determines whether or not a number of IDs read at operation S133 by the reader 2 and the maximum number of the image number read at operation S131 match (operation S134). If the CPU 11 determines that the numbers match (YES at operation S134), the CPU 11 determines that all the wireless tags 3 are operating normally and outputs a belt driving signal to a belt driving part (not shown). The belt 8 is thereby driven (operation S135) and a plurality of new wireless tags 3 to be inspected are carried. The CPU 11 brings processing back to operation S133.

If the CPU 11 determines that the numbers do not match (NO at operation S134), the CPU 11 divides the image number by 2 (operation S136). The CPU 11 reads the output voltage value corresponding to the image number after division from the location tag file 151 and changes the read range (operation S137). The reader 2 reads IDs of the wireless tag 3 (operation S138). The CPU 11 determines whether or not the image number after division and the number of IDs read by the reader 2 match (operation S139). If the CPU 11 determines that the numbers do not match (NO at operation S139), the CPU 11 further divides the image number by 2 (operation S143).

The CPU 11 determines whether or not the image number obtained after division is 1, which is the limit of division (operation S144). If the image number is not 1 (NO at operation S144), the CPU 11 brings processing back to operation S137. If, on the other hand, the CPU 11 determines that the numbers match (YES at operation S139), the CPU 11 rewrites the image numbers excluding matching image numbers to newly create a sub-image recognition file 153 in the storage part 15 (operation S141). FIG. 15 is an explanatory diagram showing a record layout of the sub-image recognition file 153. The sub-image recognition file 153 is stored in the storage part 15 shown in FIG. 3.

FIG. 15A shows an example in which new image numbers are assigned to the wireless tags 33 and 34 when the wireless tag 33 has failed and FIG. 15B shows an example in which new image numbers are assigned to the wireless tags 35 to 38 when the wireless tag 36 has failed. A new image number assigned to the wireless tag 3 to be inspected is entered in the image number field and the original image number stored in the image recognition file 152 is stored in the original image number field. The distance associated with the original image number is stored in the distance field. If the third verification is conducted, for example, in an example in which the wireless tag 33 has failed shown in FIG. 12, the number of the wireless tags 31 and 32 and the number of IDs read by the reader 2 match. Therefore, image numbers 1 and 2 corresponding to the wireless tags 33 and 34 excluding the inspected wireless tags 31, 32, and 35 to 38 are created as new image numbers in the sub-image recognition file 153. Also in this case, the wireless tags 31 and 32 of the original image numbers 1 and 2 have been verified to be operating normally and thus, the wireless tags 31 and 32 are stored in the sub-image recognition file 153 with a normal flag so that IDs corresponding to these will not be verified in processing that follows.

If the second verification is conducted in an example in which the wireless tag 36 has failed, as shown in FIG. 15B, the number of the wireless tags 31 to 34 and the number of IDs read by the reader 2 match. Therefore, image numbers 1 to 4 corresponding to the wireless tags 35 to 38 excluding the inspected wireless tags 31 to 34 are created as new image numbers in the sub-image recognition file 153. The CPU 11 determines whether or not the maximum number of the image number stored in the sub-image recognition file 153 is 2 (operation S142). If the maximum number of the image number is not 2 (NO at operation S142), the CPU 11 repeats the above processing by returning to operation S136 (FIG. 13) to further conduct verification. Also in this case, the wireless tags 31 to 34 of the original image numbers 1 to 4 have been verified to be operating normally and thus, the wireless tags 31 to 34 are stored in the sub-image recognition file 153 with a normal flag so that IDs corresponding to these will not be verified in processing that follows.

If the CPU 11 determines at operation S142 that the maximum number of the image number is 2 (YES at operation S142), the CPU 11 causes processing to move to operation S143. Processing at operation S143 is as described above and thus, a description thereof is omitted. If the CPU 11 determines that the image number after division at operation S144 is 1 (YES at operation S144), the CPU 11 reads a distance of the image number after division from the sub-image recognition file 153 if the sub-image recognition file 153 has been created at operation S141 and from the image recognition file 152 if the sub-image recognition file 153 has not been created. Then, the CPU 11 reads the output voltage value corresponding to the read distance of the image number after division from the location tag file 151 and changes the read range (operation S145). The reader 2 reads the wireless tags 3 and outputs the read IDs to the CPU 11.

The CPU 11 determines whether, among output IDs, the number of IDs read by the reader 2 excluding IDs of the verified wireless tags 3 is 1 or not (operation S146). If the CPU 11 determines that the number of IDs read by the reader 2 is not 1 (NO at operation S146), the CPU 11 determines that the wireless tag 3 corresponding to the concerned image number has failed (operation S147). The CPU 11 reads the distance corresponding to the image number stored in the image recognition file 152 or the sub-image recognition file 153 and displays image information indicating a failure in the display part 14.

If the CPU 11 determines that the number of IDs read by the reader 2 is 1 (YES at operation S146), the CPU 11 determines that because the wireless tag 3 whose image number is greater than this by 1 has failed, the wireless tag 3 corresponding to the image number obtained by adding 1 to the concerned image number has failed (operation S148). The CPU 11 reads the distance corresponding to the image number stored n the image recognition file 152 or the sub-image recognition file 153 and displays image information indicating a failure in the display part 14.

This embodiment is configured as described above and other components and operations are the same as those in the above described embodiment. Thus, the same reference numerals are attached to the corresponding components and a detailed description thereof is omitted.

Figure 16:
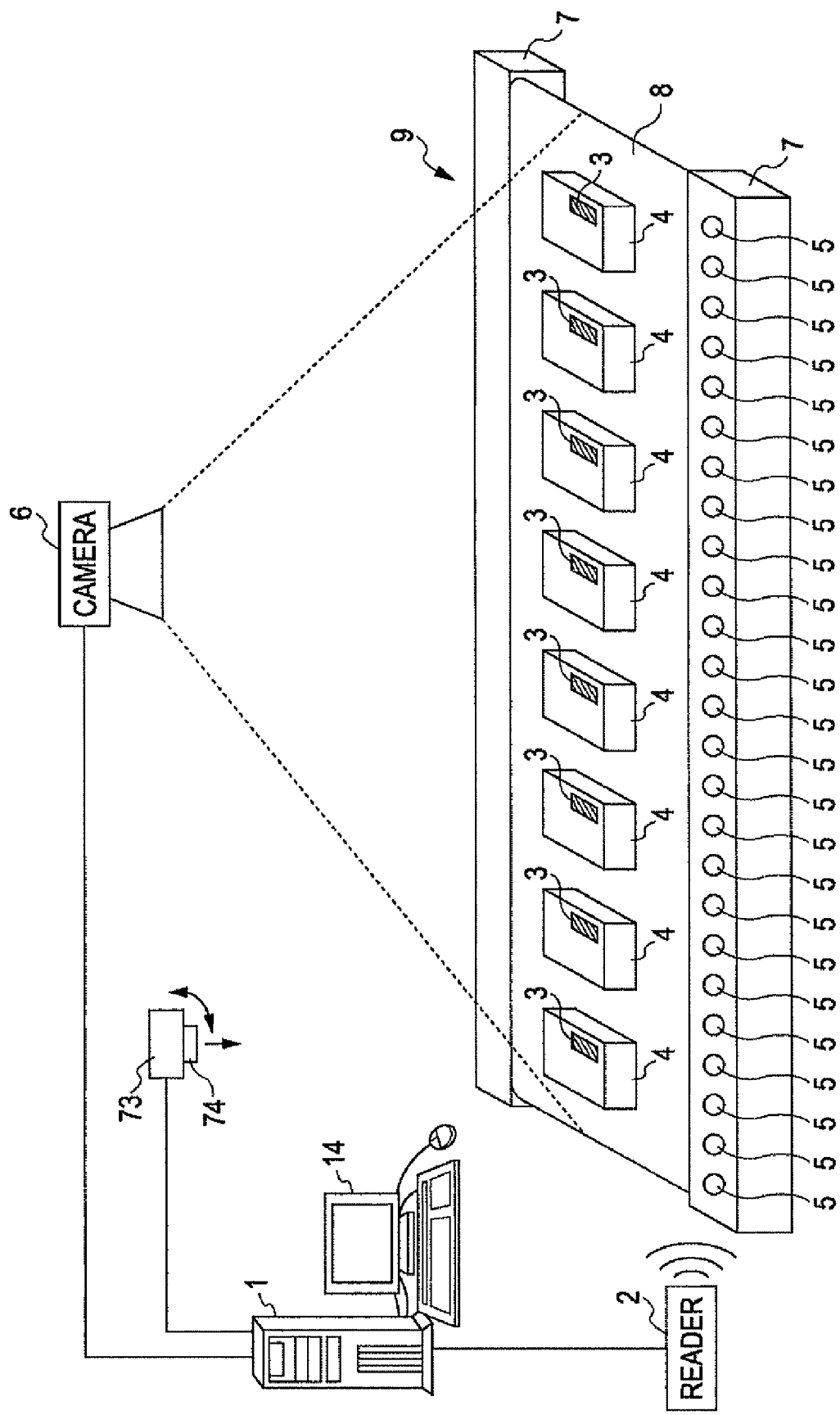
FIG. 16 is a schematic diagram showing an overview of a determination system according to an embodiment.
Figure 17:
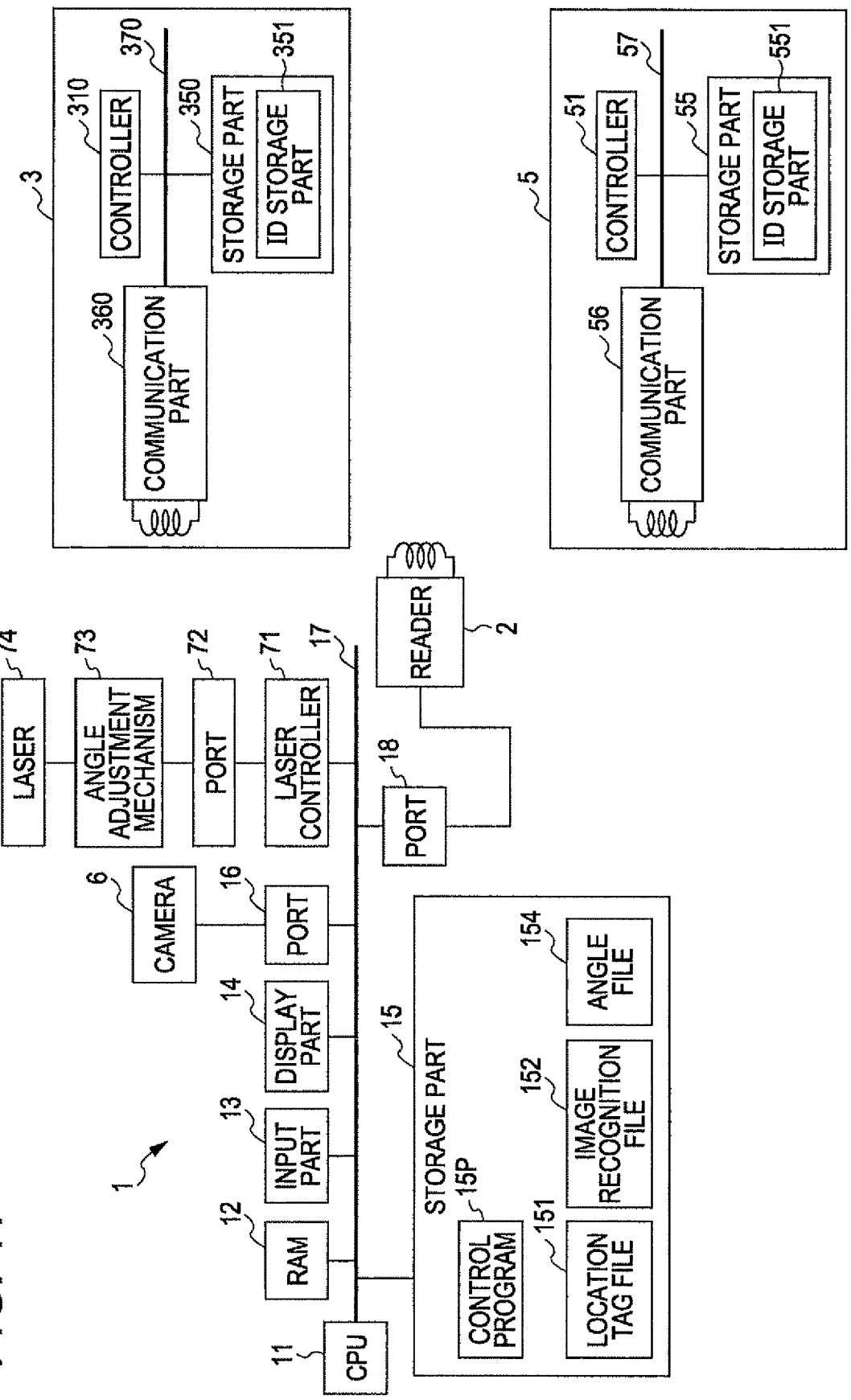
FIG. 17 is a block diagram showing a hardware configuration of a computer, a wireless tag, and a location tag according to an embodiment.

According to an embodiment relates to a mode in which instruction(s) of the failed wireless tag are executed by an irradiation part. FIG. 16 is a schematic diagram showing an overview of a determination system according to an embodiment. FIG. 17 is a block diagram showing a hardware configuration of the computer 1, the wireless tag 3, and the location tag 5 according to an embodiment. In addition to the configuration of the embodiment described above, an angle file 154, a laser 74 to operate as an irradiation part, an angle adjustment mechanism 73, a port 72, and a laser controller 71 to operate as an irradiation controller are newly provided.

In addition to the laser 74 in the present embodiment, an LED (Light Emitting Diode), a bulb and the like are used as an irradiation part for irradiating the failed wireless tag with light. As shown in FIG. 16, the laser 74 is hung via the angle adjustment mechanism 73, for example, immediately above one end of the supporting table 7 facing the direction of the belt 8. The laser 74 follows instruction(s) of the laser controller 71 to turn on or turn off a laser light. The angle adjustment mechanism 73 is formed of a motor, gears, and the like and follows instructions of the laser controller 71 to appropriately change the irradiation direction of the laser 74 from one end to the other end of the supporting table 7. The laser controller 71 follows instructions of the CPU 11 to output the irradiation angle of the laser 74 to the angle adjustment mechanism 73 via the port 72. The laser controller 71 also follows instruction(s) of the CPU 11 to output an ON or OFF signal of the laser 74 to the laser 74 via the port 72.

FIG. 18 is an explanatory diagram showing a record layout of the angle file 154. The angle file 154 has irradiation angles of the laser 74 stored therein in association with the distance. For example, one end of the supporting table 7 is immediately below and is thus stored as the angle 0 degree. Then, each time the distance increases from one end to the other end of the supporting table 7, each angle corresponding to each distance is stored in such a way that the irradiation angle becomes larger. When the CPU 11 reads the distance of the failed wireless tag at operation S115 (FIG. 11), the CPU 11 outputs the distance information to the laser controller 71. The laser controller 71 reads the angle corresponding to the distance from the angle file 154. The CPU 11 also outputs an ON signal to the laser controller 71. The laser controller 71 outputs angle information to the angle adjustment mechanism 73. Upon receipt of the angle information, the angle adjustment mechanism 73 changes the irradiation direction of the laser 74 to irradiate the failed wireless tag with a laser light. The laser controller 71 also outputs an ON signal to the laser 74. The failed wireless tag is thereby irradiated with a laser light.

FIG. 19 is a flow chart showing the procedure for control processing of the laser 74. With the processing described in the above embodiment, the CPU 11 reads the distance of the failed wireless tag from the reader 2 (operation S191). The CPU 11 outputs the ON signal and distance to the laser controller 71 (operation S192). The laser controller 71 reads the irradiation angle corresponding to the distance by referencing the angle file 154 (operation S193). The laser controller 71 outputs the read irradiation angle to the angle adjustment mechanism 73 (operation S194).

The angle adjustment mechanism 73 drives a motor and gears (not shown) to change the irradiation direction of the laser 74 up to the output angle (operation S195). The laser controller 71 outputs the ON signal to the laser 74 (operation S196). The laser 74 irradiates the failed wireless tag with a laser light (operation S197).

This embodiment is configured as described above and other components and operations are the same as those in the above described embodiments. Thus, the same reference numerals are attached to the corresponding components and a detailed description thereof is omitted.

Figure 20:
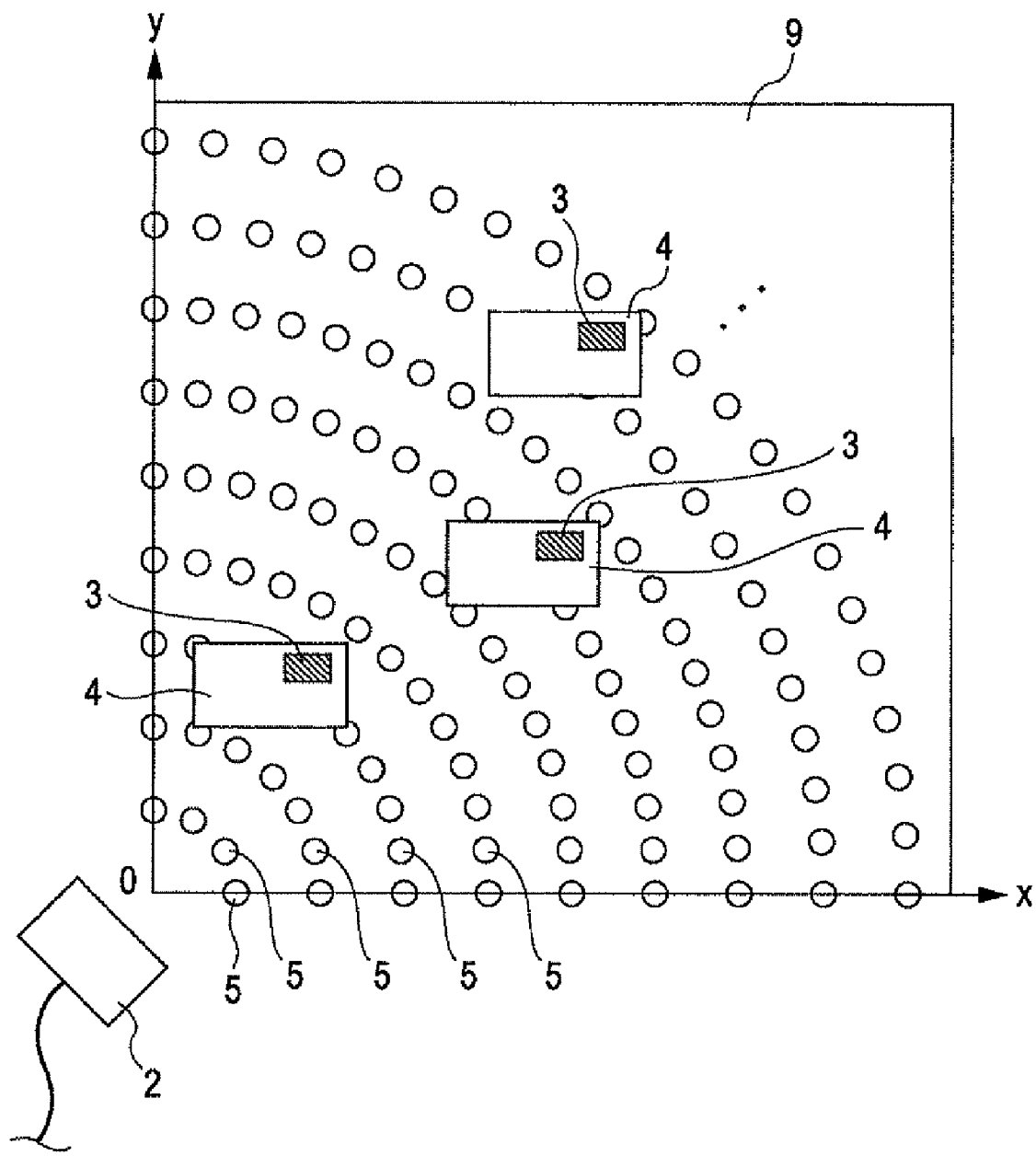
FIG. 20 is a schematic plan view schematically showing arrangement conditions of location tags in a plane view of a determination system.

This embodiment relates to a mode in which the location tag 5 dispersed on a plane is used. FIG. 20 is a schematic plan view schematically showing arrangement conditions of location tags 5 in a plane view of a determination system. Each of the location tags 5, 5, . . . denoted by a white circle is embedded in a rectangular examining table 9 in the plane view. The reader 2 is arranged at the left corner of the examining table 9 with the emission direction of beam directed toward the direction of the examining table 9. The reader 2 is assumed below to be positioned at a point of origin (0, 0) in an (x, y) coordinate system in the plane view of the examining table 9. The location tags 5 are arranged in an arc shape every determined radius (for example, 10 cm) around the arrangement position of the reader 2. That is, a plurality of location tags 5, 5, . . . are arranged on the arc of a radius r on the x, y plane in the plane view and further, a plurality of location tags 5, 5, . . . are arranged also on the arc of a radius nr (n is a positive integer). Each of the location tags 5 to be arranged on the predetermined radius may be arranged, for example, at intervals of about 5 cm as a distance in a straight line.

The reader 2 has a reading angle of about 90 degrees in a fan shape to make the whole surface of the examining table 9 the read range, and increases/decreases the read range in a radius direction in accordance with an increase/decrease of the output voltage value from the CPU 11. As described in the above embodiment, the CPU 11 reads LID of the location tag 5 whose radius is known by increasing/decreasing the output voltage value and stores, as shown in FIG. 4, the radius and LID corresponding to the output voltage value in the location tag file 151 in accordance with a read result. Articles 4 with the wireless tag 3 attached thereto are dispersed on the examining table 9.

As described in the above embodiment, the CPU 11 recognizes an image of the wireless tag 3 obtained from the camera 6 and calculates the coordinate value where the wireless tag 3 is present. More specifically, the coordinate value of the wireless tag 3 may be determined by calculating coordinate values at four corners of the wireless tag 3 by edge detection or the like and an average value of the four coordinate values. Then, the CPU 11 determines a distance in a straight line on coordinate axes based on the calculated coordinate value and the coordinate of origin where the reader 2 is present and multiplies the distance in a straight line by the length per coordinate value (per pixel) to calculate the distance.

The CPU 11 stores, as shown in FIG. 6, the image number and the calculated distance in the image recognition file 152 by associating them. Then, as described in one of the above described embodiment, the CPU 11 increases/decreases the read range by increasing/decreasing the output voltage value of the reader 2 to determine the failed wireless tag. Since the processing to determine the failed wireless tag has been described in the above described embodiments, a detailed description thereof is omitted.

Figure 21:
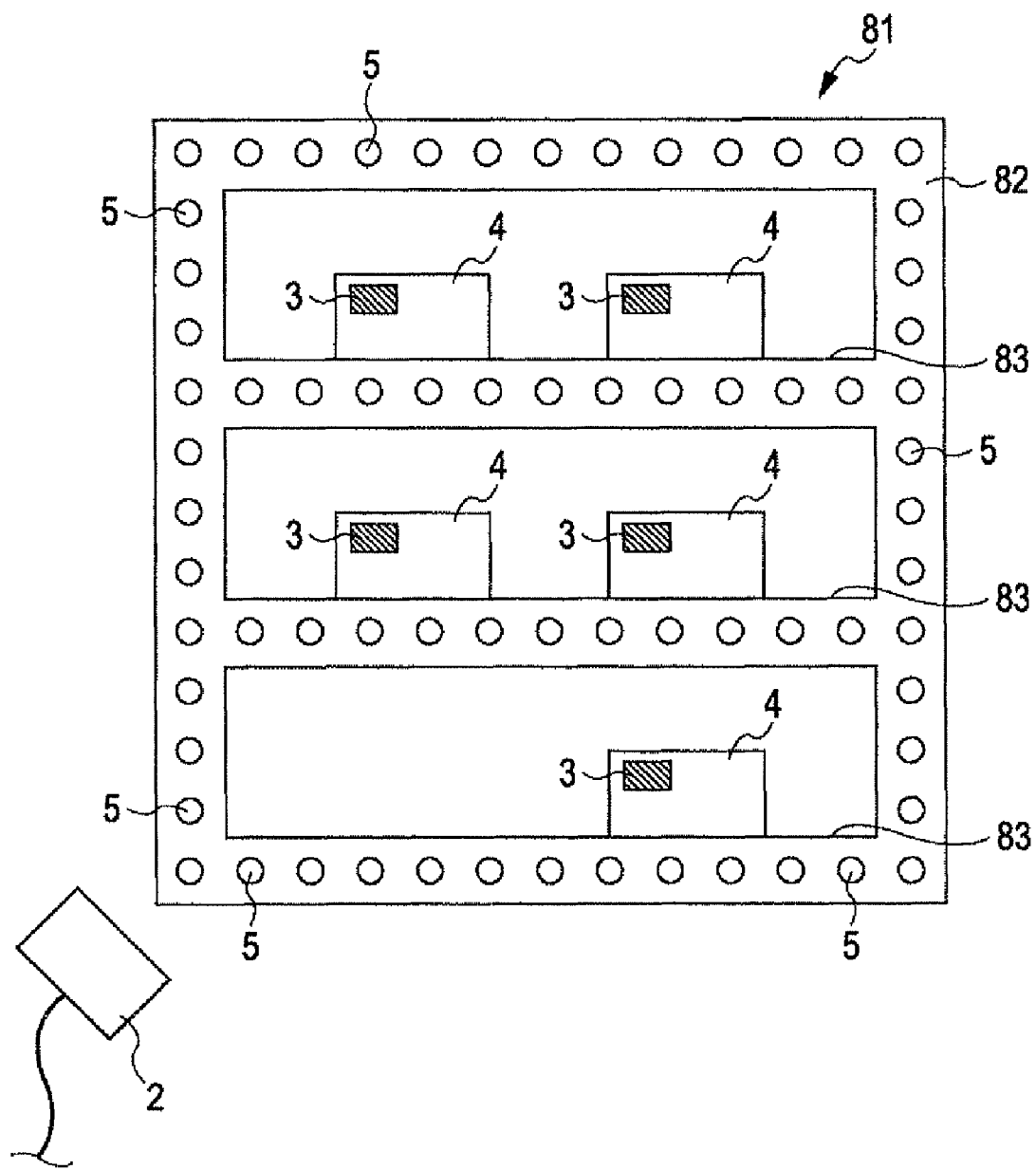
FIG. 21 is a schematic front view schematically showing a front view of a shelf on which articles are placed.

Though the present embodiment describes a mode in which the location tag 5 is embedded in the examining table 91 the location tag 5 may be affixed onto a frame of a shelf on which the articles 4 are placed. FIG. 21 is a schematic front view schematically showing a front view of a shelf on which the articles 4 are placed. A shelf 81 has a plurality of mounting bases 83, 83, 83 and the articles 4 having the wireless tag 3 mounted thereon are placed on each mounting base 83. A plurality of locations tags 5, 5, . . . are mounted on a shelf frame 82 enclosing the mounting base 83 at predetermined intervals. The reader 2 is arranged in the left corner in the front view facing the shelf 81 so that the location tag 5 mounted on the shelf frame 82 can be read. The distance in a straight line from the reader 2 to each location tag 5 is measured in advance and known. The camera 6 is arranged near the front center in order to capture images of the whole shelf 81. Then, the processing described in the above described embodiments may be performed to determine the output voltage to the location tag 5 and to perform image recognition of the wireless tag 3 and processing of determining the failed wireless tag.

This embodiment is configured as described above and other components and operations are the same as those in the above described embodiments. Thus, the same reference numerals are attached to the corresponding components and a detailed description thereof is omitted.

Figure 22:
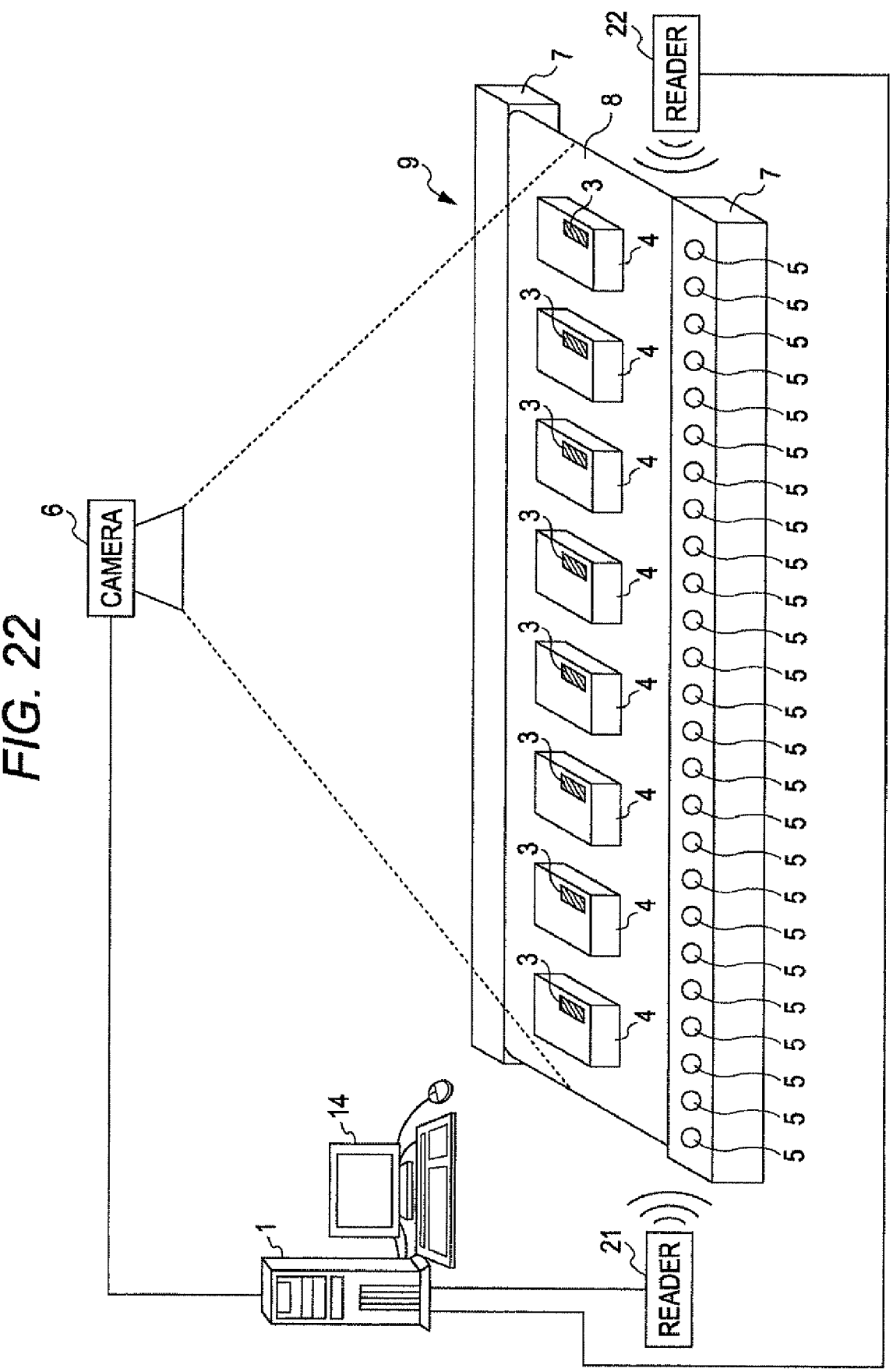
FIG. 22 is a schematic diagram showing an overview of a determination system according to an embodiment.

An embodiment relates to a mode in which a plurality of readers 2 are used. FIG. 22 is a schematic diagram showing the overview of a determination system according to an embodiment and FIG. 23 is a block diagram showing the hardware configuration of the computer 1, the wireless tag 3, and the location tag 5 according to an embodiment. In this embodiment, in addition to a reader 21 arranged at one end of the supporting table 7 described in the above embodiment, a reader 22 arranged opposite to this is newly provided. The reader 22 is arranged at the other end of the supporting table 7 directed toward the direction of the one end where the reader 21 is arranged. The reader 22 is connected to the computer 1 via a port 180 and changes the read range following instructions of the CPU 11. The reader 21 is replaced by the first reader 21 and the reader 22 is replaced by the second reader 22 for a description that follows.

FIG. 24 is an explanatory diagram showing the record layout of the location tag file 151 according to this embodiment. The location tag file 151 includes an LID field, a distance field from the first reader 21, an output voltage value field of the first reader 21, a distance field from the second reader 22, and an output voltage value field of the second reader 22. The LID field, the distance field from the first reader 21, and the output voltage value field of the first reader 21 store, as shown in FIG. 4 in the above embodiment, the known distance from the first reader 21 to each location tag 5 and the output voltage value of the first reader 21 corresponding to the distance by associating with LID of each location tag 5.

Similarly, the distance field from the second reader 22 and the output voltage value field of the second reader 22 store the known distance from the second reader 22 to each location tag 5 and the output voltage value of the second reader 22 corresponding to the distance by associating with LID of each location tag 5. Since the distance from the second reader 22 to each location tag 5 is known, a user inputs information of the LID and distance through the input part 13. The CPU 11 stores the input LID and the distance from the second reader 22 in the location tag file 151. The CPU 11 causes the output voltage of the second reader 22 to gradually increase and, each time LID is successfully read, stores the output voltage value at that time in the location tag file 151 by associating with LID. For the location tag 5 whose LID is "L29", for example, 290 cm for the distance from the first reader 21 and 20 cm for the distance from the second reader 22 are stored. Corresponding to this, v29 for the output voltage of the first reader 21 and v2 for the output voltage of the second reader 22 are stored.

The CPU 11 controls the first reader 21 and the second reader 22 to read the common wireless tag 3. If both the readers can read the common ID, the wireless tag 3 is determined to be operating normally and, if both the readers cannot read the common ID, the wireless tag 3 positioned at the concerned position is determined to have failed. If, for example, the wireless tag 38 is verified, the CPU 11 reads the distance 240 cm from the first reader 21 corresponding to the distance image number 8 from the image recognition file 152. The CPU 11 reads the output voltage corresponding to the distance 240 cm from the first reader 21 from the location tag file 151. In this case, the output voltage of the first reader 21 becomes v24 and conversely, the output voltage of the second reader 22 becomes v7.

The CPU 11 sets the output voltage of the first reader 21 at v24 and reads ID of the wireless tag 38. The CPU 11 also sets the output voltage of the second reader 22 at v7 and reads ID of the wireless tag 38. Here, if the same ID is read, the wireless tag 38 is determined to be operating normally and, if the same ID cannot be read, the wireless tag 38 is determined to have failed.

Figure 25:
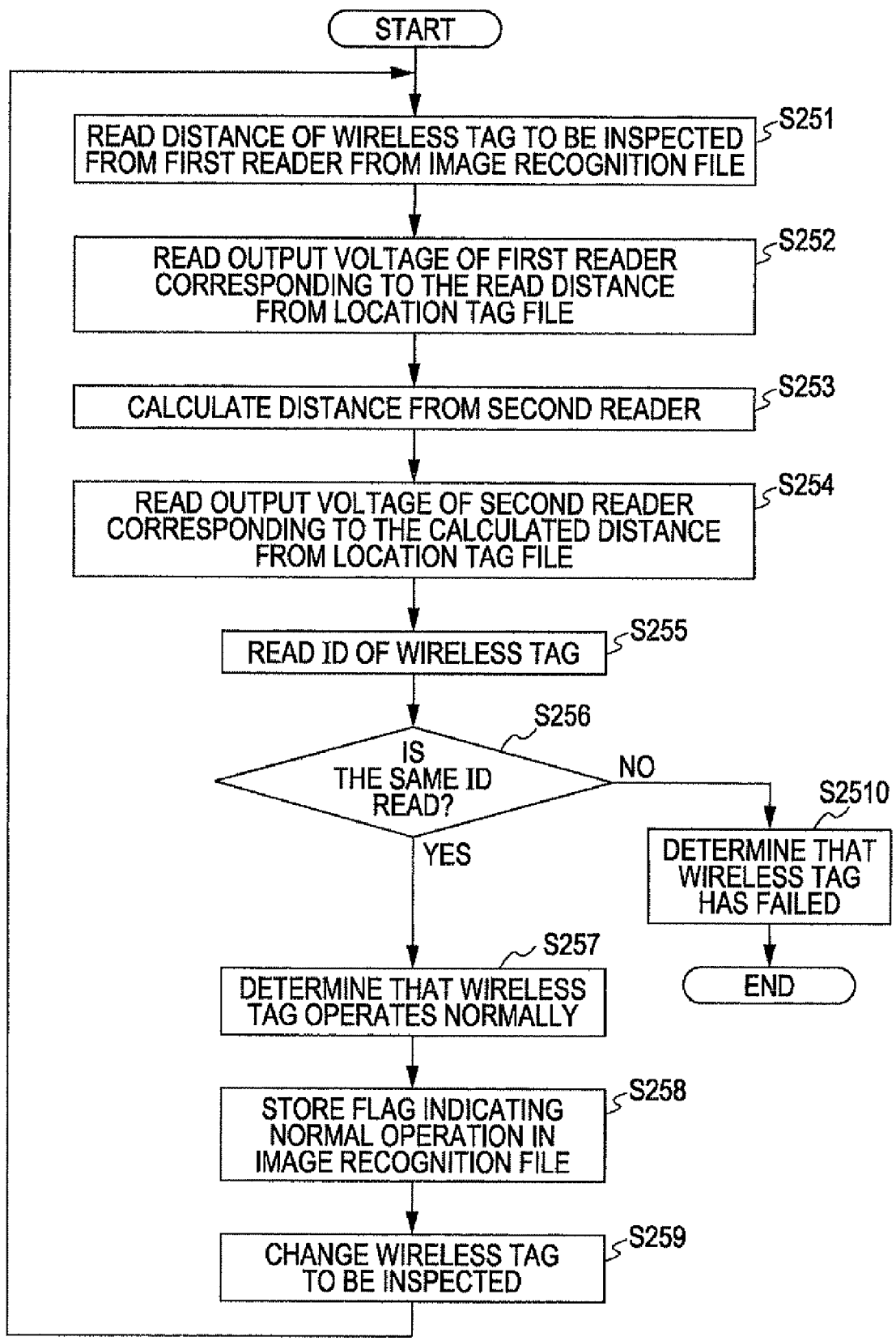
FIG. 25 is a flow chart showing a procedure for determination processing according to an embodiment.

FIG. 25 is a flow chart showing the procedure for determination processing according to an embodiment. In the case of NO at operation S104 described in the above embodiment, that is, in the case where the number of IDs read by the first reader 21 and the maximum number of the image number obtained from image recognition do not match, the CPU 11 inspects the wireless tag 3 individually. The CPU 11 reads the distance from the first reader 21 of the wireless tag 3 to be inspected of any image number from the image recognition file 152 (operation S251). The CPU 11 reads the output voltage of the first reader 21 corresponding to the read distance from the location tag file 151 (operation S252). The CPU 11 calculates the distance from the second reader 22 to the wireless tag 3 to be inspected based on the distance read at operation S251 (operation S253). More specifically, the distance between the first reader 21 and the second reader 22 is stored in the storage part 15 in advance and the CPU 11 calculates the distance from the second reader 22 to the wireless tag 3 to be inspected by reading the distance between the first reader 21 and the second reader 22 and subtracting the distance read at operation S251.

The CPU 11 reads the output voltage of the second reader 22 corresponding to the calculated distance from the location tag file 151 (operation S254). The CPU 11 sets the output voltage of the first reader 21 to that read at operation S252, the output voltage of the second reader 22 to that read at operation S254, and reads ID of the wireless tag 3 to be inspected (operation S255). The first reader 21 and the second reader 22 each output the read ID to the CPU 11. The CPU 11 accepts the output IDs and determines whether or not ID of the same wireless tag 3 has been read (operation S256).

If the CPU 11 determines that the same ID has been read (YES at operation S256), the CPU 11 determines that the wireless tag 3 is operating normally (operation S257) and stores a flag indicating normal operation by associating with the image number (operation S258). Next, the CPU 11 references flags indicating normal operation, changes the wireless tag 3 to be inspected to one related to an image number for which a flag indicating normal operation is not stored (operation S259), and brings processing back to operation S251. If, on the other hand, the CPU 11 determines that the same ID has not been read (NO at operation S256), the CPU 11 determines that the wireless tag 3 related to the image number has failed (operation S2510) and terminates a sequence of processing.

Due to characteristics of the wireless tag 3, the first reader 21 and the second reader 22 may not be readable even through the first reader 21 and the second reader 22 are operating normally because sensitivity to a beam is weak. If, for example, the wireless tag 38 is verified, the CPU 11 reads the distance 240 cm from the first reader 21 corresponding to the image number 8 from the image recognition file 152. The CPU 11 reads the output voltage corresponding to the distance 240 cm from the first reader 21 from the location tag file 151. In this case, the output voltage of the first reader 21 becomes v24 and conversely, the output voltage of the second reader 22 becomes v7. However, if the wireless tag 38 has low sensitivity, ID may not be readable, leading to a false determination that the wireless tag 38 has failed.

In this case, the CPU 11 increases the read range of the first reader 21 and the second reader 22 by a predetermined range. This increase of the read range may be stored in the storage part 15 in advance. In the present example, for example, the read range is increased by 10 cm, that is, the output voltage is increased by one operation so that the output voltage of the first reader 21 becomes v25 and that of the second reader 22 becomes v8. If ID of the wireless tag 38 becomes readable by the first reader 21 and the second reader 22 by increasing the read range, the wireless tag 38 is determined to be operating normally. If, on the other hand, ID of the same wireless tag 3 is not readable even after increasing the read range, the wireless tag 38 is determined to have failed. Accordingly, possibilities of a false determination involved in strength in sensitivity inherent in the wireless tag 3 can be reduced.

Figure 26:
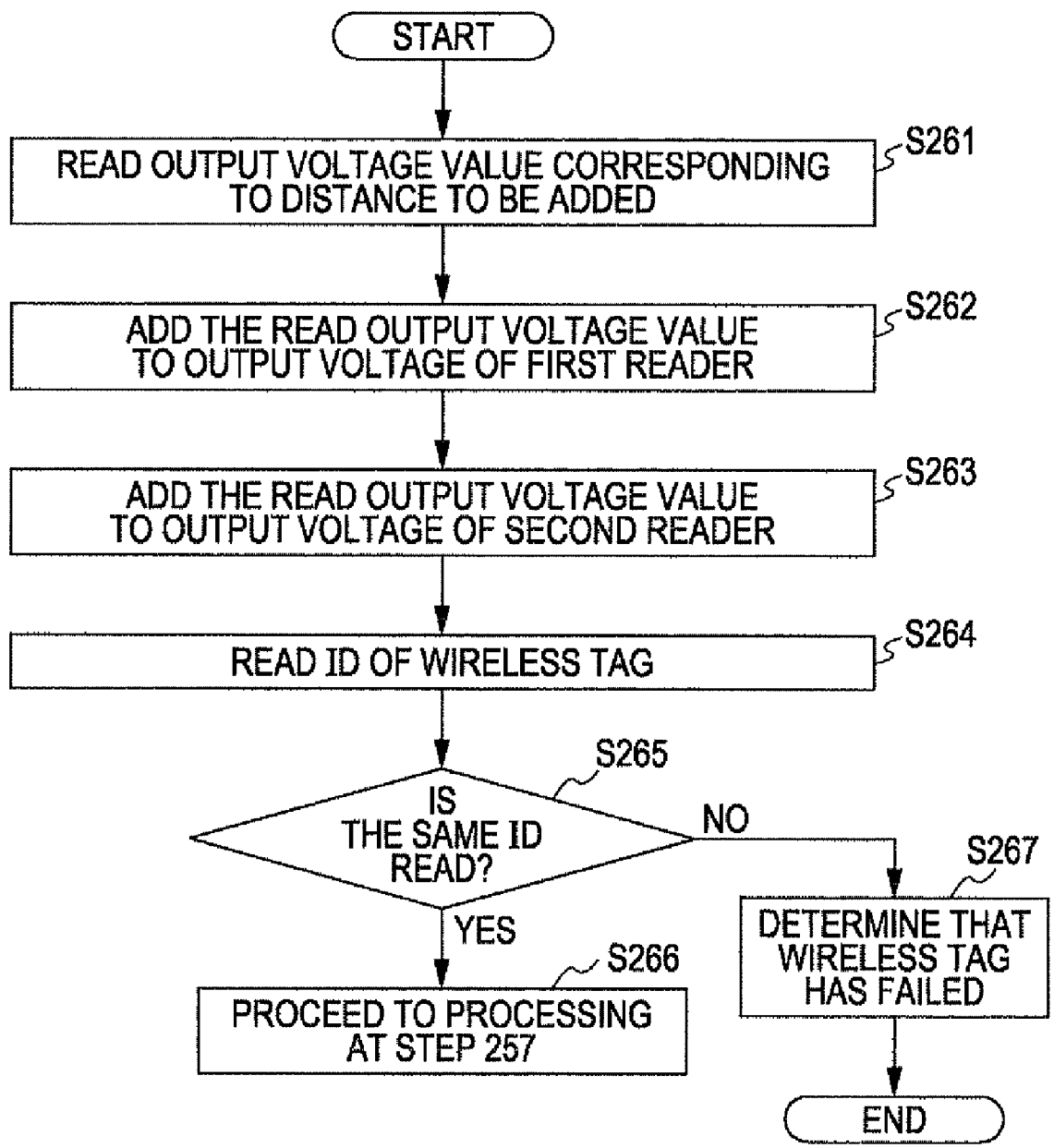
FIG. 26 is a flow chart showing a procedure for determination processing to reduce an influence caused by sensitivity.

FIG. 26 is a flow chart showing the procedure for determination processing to reduce an influence caused by sensitivity. The CPU 11 reads the output voltage value corresponding to a distance to be added from the storage part 15 to increase the read range (operation S261). The distance to be added may be, for example, the installation interval of the location tag 5. The CPU 11 adds the read output voltage value of the first reader 21 to that read at operation S252 (operation S262). The CPU 11 adds the read output voltage value of the second reader 22 to that read at operation S254 (operation S263).

The CPU 11 sets the output voltage of the first reader 21 to that added at operation 262, the output voltage of the second reader 22 to that added at operation 263, and reads ID of the wireless tag 3 to be inspected (operation S264). The first reader 21 and the second reader 22 each output the read ID to the CPU 11. The CPU 11 determines whether or not ID of the same wireless tag 3 has been read (operation S265). If the CPU 11 determines that the same ID has been read (YES at operation S265), the CPU 11 brings processing back to operation S257 (operation S266). If, on the other hand, the CPU 11 determines that the same ID has not been read (NO at operation S265), the CPU 11 determines that the wireless tag 3 related to the image number has failed (operation S267) and terminates a sequence of processing.

This embodiment is configured as described above and other components and operations are the same as those in the above described embodiments. Thus, the same reference numerals are attached to the corresponding components and a detailed description thereof is omitted.

Figure 27:
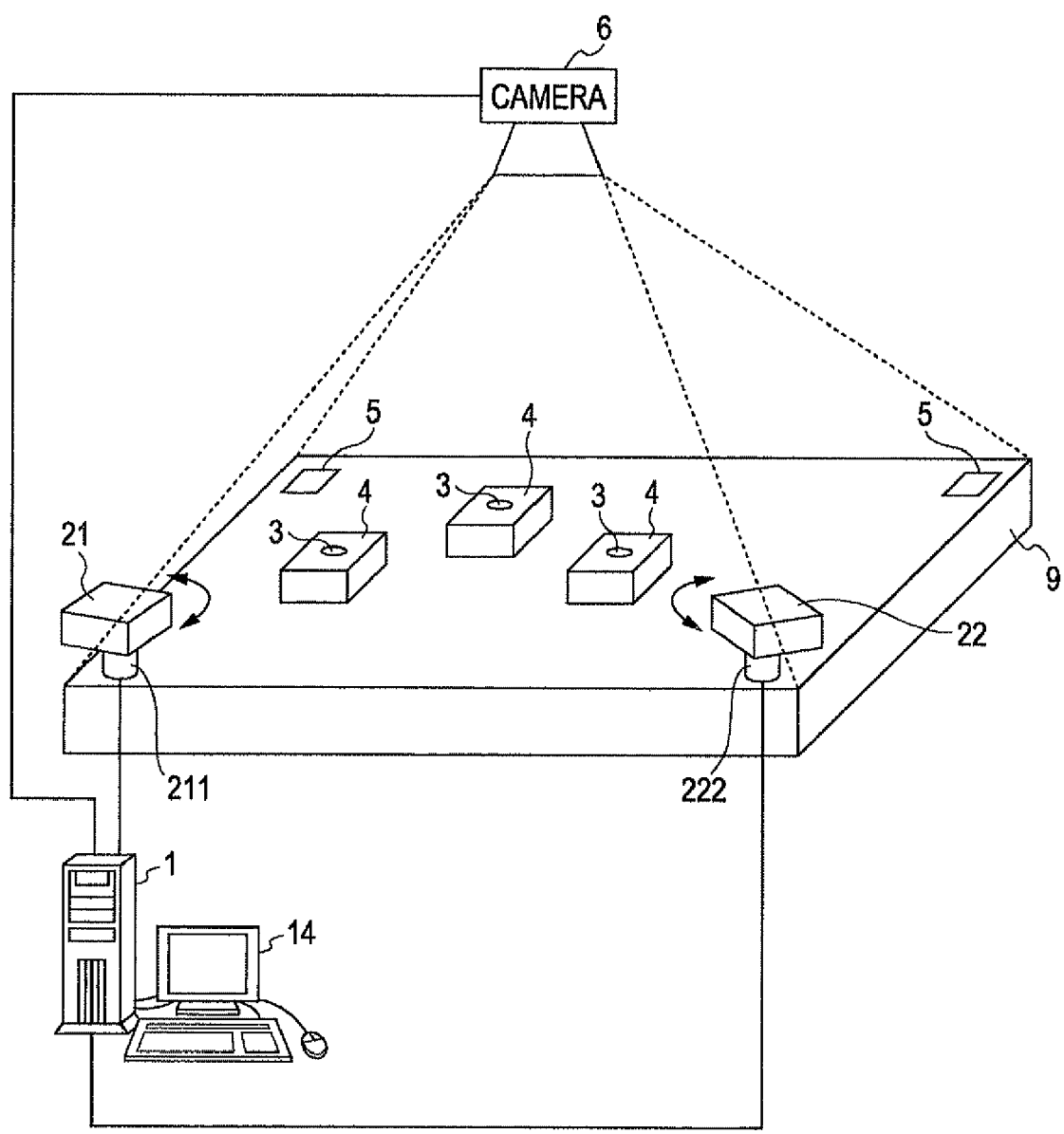
FIG. 27 is a schematic diagram showing an overview of a determination system according to an embodiment.

An embodiment relates to a mode in which the failed wireless tag is determined by using a plurality of readers 2 capable of changing the emission angle of beam of the readers 2. FIG. 27 is a schematic diagram showing the overview of a determination system according to this embodiment. A plurality of articles 4, 4, . . . on which the wireless tag 3 to be inspected is mounted are placed on the rectangular examining table 9. The first reader 21 is arranged at the lower left corner in a plane view on the examining table 9 and the second reader 22 is arranged at the lower right corner in the plane view on the examining table 9.

Readers that output a beam with a narrow reading angle and strong directivity are used as the first reader 21 and the second reader 22 in the present embodiment. In the present embodiment, the number of array antennas used by the first reader 21 and the second reader 22 is increased from that in the forth embodiment and the reading angle is made narrower (for example, 5 degrees) than that in the above described embodiment (90 degrees). An angle adjustment mechanism 211 to change the reading angle of the first reader 21, that is, the emission angle of beam is provided below the first reader 21 of the reader 2. The angle adjustment mechanism 211 is constructed of, for example, a motor (not shown) and a rotation axis one end of which is connected to the motor and the other end of which is connected to the bottom of housing of the first reader 21, and rotates the first reader 21 in a horizontal direction following instructions of the CPU 11. The location tag 5 is arranged at appropriate locations on the examining table 9 to verify that the first reader 21 and the second reader 22 are operating correctly. In the present embodiment, the location tags 5, 5 are each arranged at the upper right and upper left corners in the plane view on the examining table 9.

Similarly, an angle adjustment mechanism 222 to change the emission angle of beam of the second reader 22 is provided below the second reader 22 of the reader 2. The angle adjustment mechanism 222 includes a motor (not shown) and a rotation axis one end of which is connected to the motor and the other end of which is connected to the bottom of housing of the second reader 22. The angle adjustment mechanism 222 rotates the second reader 22 in the horizontal direction following instructions of the CPU 11. The camera 6 is hung from a ceiling or the like immediately above an approximate center of the examining table 9 with the imaging direction directed toward the examining table 9. The imaging range of the camera 6 is a range including the whole surface of the examining table 9, that is, the first reader 21, the second reader 22, and the location tags 5, 5. The articles 4 are placed on the examining table 9 with the mounting direction of the wireless tag 3 facing the camera 6 to allow image recognition of the wireless tag 3.

FIG. 28 is a block diagram showing the hardware configuration of the computer 1, the wireless tag 3, and the location tag 5 according to this embodiment. As described above, the first reader 21 and the angle adjustment mechanism 211 of the first reader 21 are connected to the CPU 11 via a port 18. Similarly, the second reader 22 and the angle adjustment mechanism 222 of the second reader 22 are connected to the CPU 11 via the port 180. The CPU 11 outputs angle information to the angle adjustment mechanisms 211 and 222. Based on output angle information, the angle adjustment mechanisms 211 and 222 change the beam emission angle of the first reader 21 and that of the second reader 22, respectively.

Figure 29:
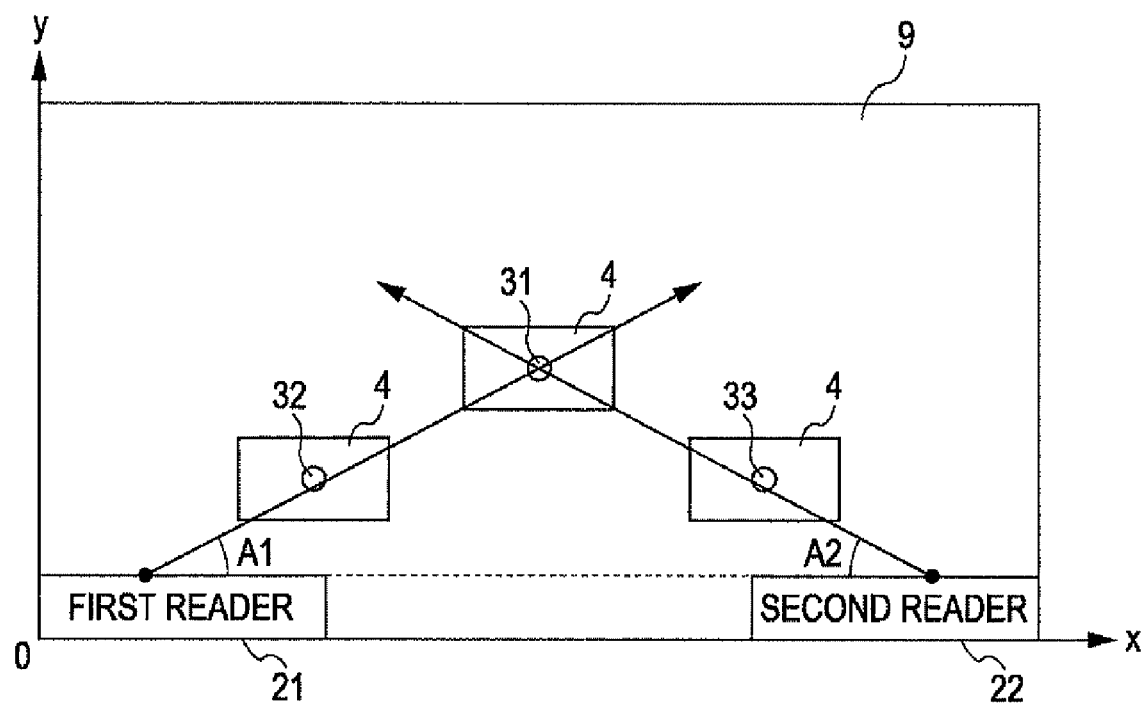
FIG. 29 is an explanatory diagram showing an appearance of an image captured by a camera.

FIG. 29 is an explanatory diagram showing an appearance of an image captured by the camera 6. The direction from the first reader 21 to the second reader 22 is defined as the positive x axis direction and the direction perpendicular to the x axis from the first reader 21 is defined as the positive y axis direction. The emission angle of beam of the first reader 21 is defined so that an angle in parallel with the x axis directed toward the positive x axis is 0 degree and that in parallel with the y axis directed toward the positive y axis is 90 degrees. The angle adjustment mechanism 211 changes the first reader 21 in the range of 0 degree to 90 degrees. The emission angle of beam of the second reader 22, on the other hand, is defined so that an angle in parallel with the x axis directed toward the negative x axis is 0 degree and that in parallel with the y axis directed toward the positive y axis is 90 degrees. The angle adjustment mechanism 222 changes the second reader 22 in the range of 0 degree to 90 degrees.

To make a description of the present embodiment easier, an example of verifying the wireless tags 31, 32, and 33 mounted on the three articles 4, 4, 4 will be described. FIG. 29 exemplifies verification of the wireless tag 31. Based on image data captured from the camera 6, the CPU 11 calculates coordinate values of the first reader 21, the second reader 22, and the wireless tag 31. The coordinate value of the wireless tag 31 is as described in the above embodiment. If the wireless tag 31 is circular as shown in FIG. 29, the coordinate value may be a coordinate value to determine the center of the circle. A user may input coordinate values to be the centers of the first reader 21 and the second reader 22 into the storage part 15 in advance through the input part 13 as the coordinate values of the first reader 21 and the second reader 22. The coordinate values to be centers may, for example, be centers on an upper surface of housing of the first reader 21 and the second reader 22. Or, coordinate values may be determined by pattern matching or edge detection, etc. after storing shapes or colors of the first reader 21 and the second reader 22 in the storage part 15.

The CPU 11 determines an angle of the first reader 21 with respect to the wireless tag 31 formed by the coordinate value of the wireless tag 31, that of the first reader 21, and that of the second reader 22, that is, an emission angle A1 from the coordinate values of the first reader 21, the second reader 22, and the wireless tag 31. Similarly, the CPU 11 determines an angle of the second reader 22 with respect to the wireless tag 31 formed by the coordinate value of the wireless tag 31, that of the second reader 22, and that of the first reader 21, that is, an emission angle A2.

The CPU 11 outputs the calculated emission angle A1 to the angle adjustment mechanism 211 and the calculated emission angle A2 to the angle adjustment mechanism 222. The angle adjustment mechanism 211 changes the emission angle of the first reader 21 according to the output emission angle A1, as shown in FIG. 29. Similarly, the angle adjustment mechanism 222 changes the emission angle of the second reader 22 according to the output emission angle A2, as shown in FIG. 29. Here, IDs of the wireless tag 31 and the wireless tag 32 should be readable from the first reader 21. From the second reader 22, on the other hand, IDs of the wireless tag 33 and the wireless tag 31 should be readable. Thus, if ID of the same wireless tag 3 is readable from both the first reader 21 and the second reader 22, the wireless tag 31 to be inspected is determined to be operating normally. If, on the other hand, the wireless tag 31 has failed, the same ID cannot be read from the first reader 21 and the second reader 22. In this case, the CPU 11 determines that the wireless tag 31 to be inspected is the wireless tag 3 that has failed.

Figure 30:
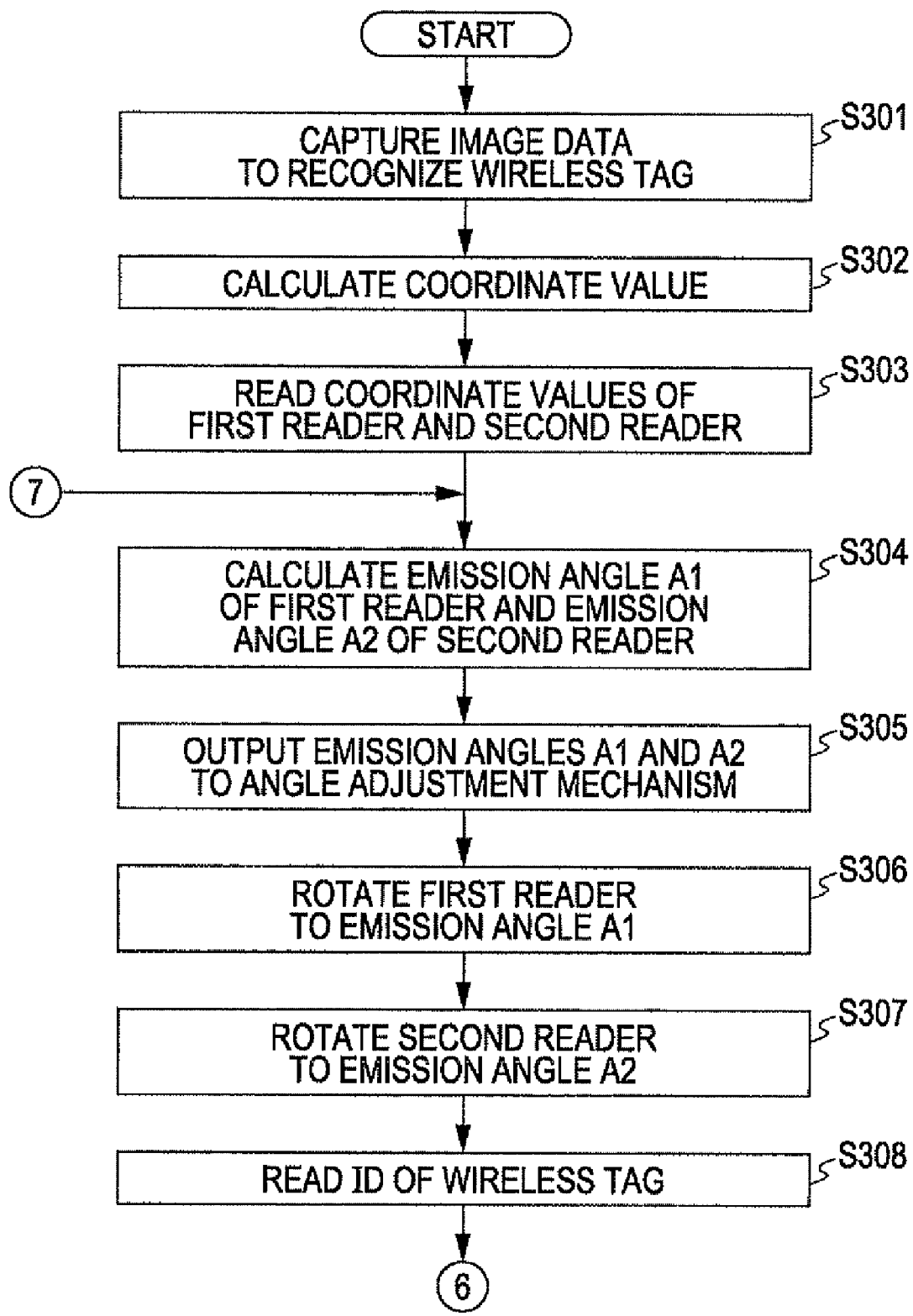
FIG. 30 is a flow chart showing a procedure for determining a failed wireless tag.
Figure 31:
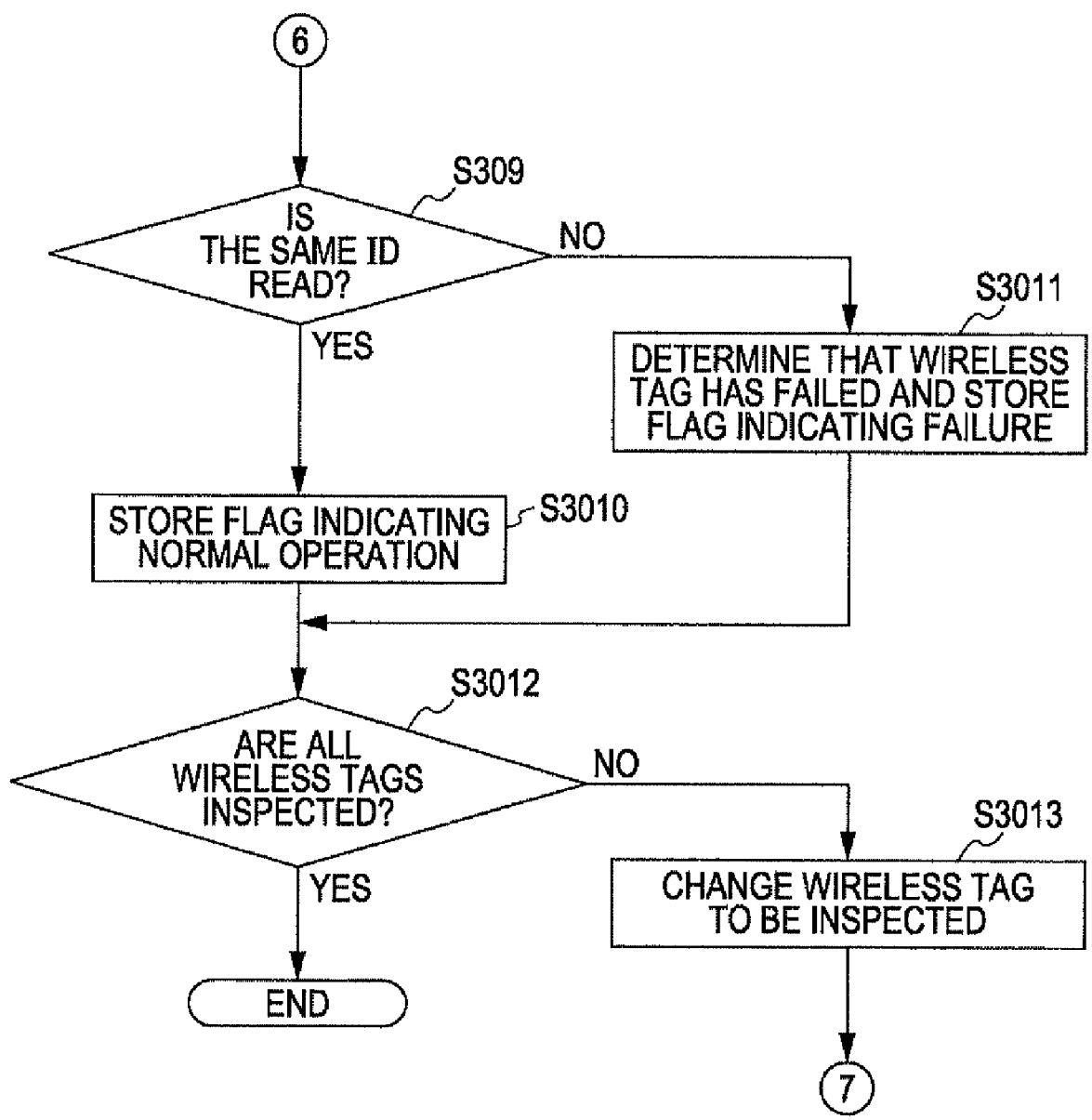
FIG. 31 is a flow chart showing the procedure for determining a failed wireless tag.

FIGS. 30 and 31 are flow charts showing the procedure for determining the failed wireless tag. The CPU 11 captures image data output from the camera 6 and recognizes the wireless tag 3 in a captured image by referencing the shape of the wireless tag 3 stored in the storage part 15 (operation S301). The CPU 11 calculates the coordinate value of each of the wireless tags 3 (operation S302) and stores the calculated coordinate value by associating with the image number. The CPU 11 reads coordinate values of the first reader 21 and the second reader 22 from the storage part 15 (operation S303). Among coordinate values of the image numbers calculated at operation S302, the CPU 11 reads the coordinate value of the wireless tag 3 to be inspected and calculates the output emission angle A1 of the first reader 21 and the output emission angle A2 of the second reader 22 based on the read coordinate value, that of the first reader 21, and that of the second reader 22 (operation S304).

The CPU 11 outputs the output emission angle A1 to the angle adjustment mechanism 211 and the output emission angle A2 to the angle adjustment mechanism 222 (operation S305). The angle adjustment mechanism 211 rotates the emission angle of the first reader 21 up to A1 according to the output emission angle A1 (operation S306). Similarly, the angle adjustment mechanism 222 rotates the emission angle of the second reader 22 up to A2 according to the output emission angle A2 (operation S307). The first reader 21 and the second reader 22 read ID of the wireless tag 3 (operation S308). IDs read by the first reader 21 and the second reader 22 are output to the CPU 11. The CPU 11 determines whether or not the same ID has been read from both the first reader 21 and the second reader 22 (operation S309). If the CPU 11 determines that the same ID has been read (YES at operation S309), the CPU 11 stores a flag indicating normal operation is stored in the storage part 15 by associating with the image number (operation S3010).

If, on the other hand, the same ID has not been read (NO at operation S309), the CPU 11 determines that the wireless tag 3 related to the concerned image number has failed and stores a flag indicating a failure in the storage part 15 by associating with the image number (operation S3011). After performing processing at operations S3010 and 3011, the CPU 11 references flags in the storage part 15 to determine whether or not the wireless tags 3 corresponding to all image numbers have been inspected (operation S3012). If the CPU 11 determines that not all the wireless tags 3 have been inspected (NO at operation S3012), the CPU 11 changes the wireless tag 3 to be inspected (operation S3013) and brings processing back to operation S304. More specifically, the CPU 11 reads from the storage part 15 the coordinate value related to an image number for which no flag is stored, and performs processing at operation S304 and thereafter repeatedly. If, on the other hand, the CPU 11 determines that all the wireless tags 3 have been inspected, that is, all the flags are stored in the storage part 15 by associating with the image numbers (YES at operation S3012), the CPU 11 terminates a sequence of processing.

This embodiment is configured as described above and other components and operations are the same as those in the above described embodiments. Thus, the same reference numerals are attached to the corresponding components and a detailed description thereof is omitted.

Figure 32:
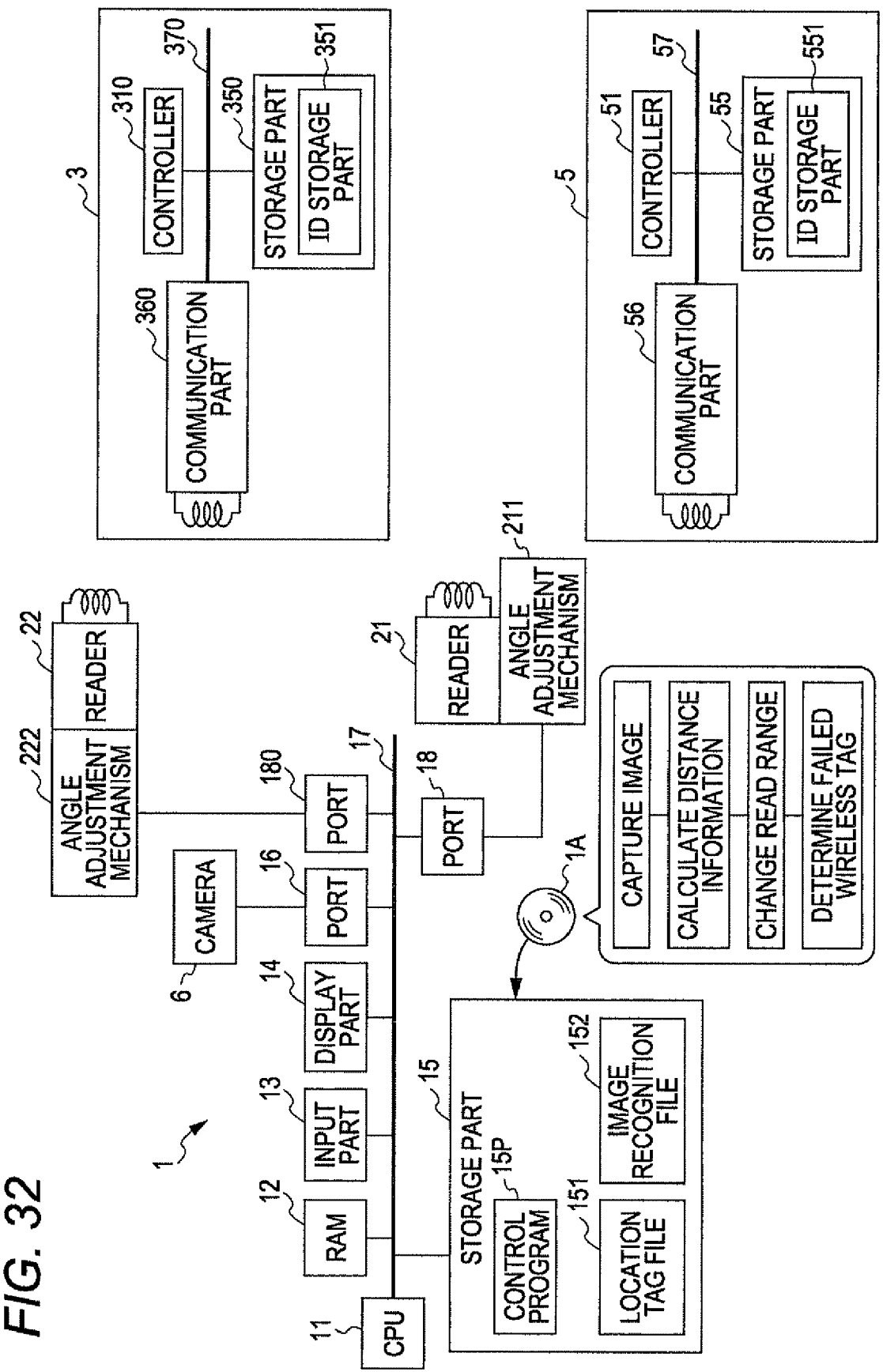
FIG. 32 is a block diagram showing a configuration of a computer according to an embodiment.

FIG. 32 is a block diagram showing the configuration of the computer 1 according to an eighth embodiment. A program for causing the computer 1 according to the eighth embodiment to operate can also be provided, like the eighth embodiment, by means of a portable storage medium 1A such as CD-ROM. Further, the computer program can also be downloaded from a server computer (not shown) via a communication network N. Contents thereof will be described below.

The portable storage medium 1A has a program recorded therein that causes the computer 1 to capture an image, calculate distance information, change the read range, and determine the failed wireless tag. The portable storage medium 1A is inserted into a storage medium reader (not shown) of the computer 1 shown in FIG. 32 to install the program in the control program 15P of the storage part 15. Or, such a program may be installed in the storage part 15 by downloading the program from an external server computer (not shown) via a communication part (not shown). Such a program is executed after being loaded into the RAM 12. Accordingly, the computer 1 functions as described above.

The eighth embodiment is configured as described above and other components and operations are the same as those in the above described embodiments. Thus, the same reference numerals are attached to the corresponding components and a detailed description thereof is omitted.

In the present invention, calculation means calculates the number of wireless tags and distance information of each wireless tag from a reader based on an image including the wireless tags among images output from an imaging device. Then, if the number of wireless tags read by the reader and that of wireless tags calculated by the calculation means do not match, determination means changes the read range by change means and determines a wireless tag that failed in reading by the reader based on distance information corresponding to the changed read range and distance information calculated by the calculation means. Failed wireless tags can thereby be determined with ease and high precision. Also by using the divide and rule method for changing the read range of the reader, failed wireless tags can efficiently be detected.

In the present invention, information for recognizing the wireless tag determined by the determination means is output by output means. A user can thereby recognize failed wireless tags with ease. Also by displaying information about failed wireless tags in a display part, the present invention achieves excellent effects of a user being able to visually recognize the information and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of determining a failed wireless tag by a reader control device controlling a reader that transmits/receives information to/from wireless tags, comprising:
   capturing images of articles having wireless tags by an imaging device;
   performing a recognition of an image including wireless tags from among images captured and calculating a number of wireless tags and distance information from the reader to each wireless tag based on the recognized image including wireless tags;

changing a read range of the reader based on a location wireless tag having a predetermined distance information from the reader;

determining a failed wireless tag that is not read by the reader based on the changed read range and the distance information calculated, and wherein said changing of the read range of the reader is executed when a number of wireless tags read by the reader and the number of wireless tags calculated do not match.

2. A system for determining a failed wireless tag, the determination system comprising:

a reader which reads wireless tags;
a reader control device which controls the reader; and
an imaging device which images wireless tags;
wherein the imaging device comprises:
an image capturing part capturing images of articles having wireless tags; and
an output part outputting the images captured by the image capturing part to the reader control device, and
wherein the reader control device comprises:
a calculation part recognizing an image including wireless tags from among images output from the imaging device and calculating a number of wireless tags and distance information from the reader to each wireless tag based on the recognized image including wireless tags;
a change part changing a read range of the reader based on a location wireless tag having a predetermined distance information from the reader; and
a determination part changing the read range of the reader by the change part when a number of wireless tags read by the reader and the number of wireless tags calculated by the calculation part do not match and determining a wireless tag that failed in a reading by the reader based on the changed read range and distance information calculated by the calculation part.

3. A reader control device for controlling a reader that transmits/receives information to/from wireless tags, the reader control device comprising:

an image capturing part capturing images of articles having wireless tags;
a calculation part recognizing an image including wireless tags from among images captured by the image capturing part and calculating a number of wireless tags and distance information from the reader to each wireless tag based on the recognized image including wireless tags;
a change part changing a read range of the reader based on a location wireless tag having a predetermined distance information from the reader; and
a determination part changing the read range of the reader by the change part when a number of wireless tags read by the reader and the number of wireless tags calculated by the calculation part do not match and determining a wireless tag that failed in a reading by the reader based on the changed read range and distance information calculated by the calculation part.

4. The reader control device according to claim 3,
wherein the determination part causes the change part to decrease or increase the read range of the reader when the number of wireless tags read by the reader and the number of wireless tags calculated by the calculation part do not match, and determines a wireless tag that failed in a reading by the reader by comparing a number of wireless tags belonging to the decreased or increased read range and distance information corresponding to the read range and the number of wireless tags calculated by the calculation part corresponding to the distance information.

5. The reader control device according to claim 3,
wherein the determination part causes the change part to decrease or increase the read range of the reader based on a divide and rule method when the number of wireless tags read by the reader and the number of wireless tags calculated by the calculation part do not match, and determines a wireless tag that failed in a reading by the reader by comparing a number of wireless tags belonging to the decreased or increased read range and distance information corresponding to the read range and the number of wireless tags calculated by the calculation part corresponding to the distance information.

6. The reader control device according to claim 3, comprising:
an output part outputting information for identifying the wireless tag determined by the determination part.

7. The reader control device according to claim 6,
wherein the output part outputs image information for identifying the wireless tag with a pixel area corresponding to distance information calculated by the calculation part and related to the wireless tag determined by the determination part.

8. The reader control device according to claim 6, comprising:
an irradiation control part controlling an irradiation position of an irradiation part that irradiates a position according to distance information from the reader with light, and
wherein the output part outputs distance information calculated by the calculation part and related to the wireless tag determined by the determination part to the irradiation control part, and
wherein the irradiation control part controls the irradiation part to the irradiation position corresponding to the output distance information.

9. The reader control device according to claim 3, comprising:
a storage part storing distance information from the reader for each location wireless tag.

10. A reader control device for controlling a plurality of readers that transmit/receive information to/from wireless tags, the reader control device comprising:
an image capturing part capturing images of articles having wireless tags;
a calculation part recognizing an image including wireless tags from among images captured by the image capturing part and calculating a number of wireless tags and distance information from a first reader to each wireless tag based on the recognized image including wireless tags;
a change part changing a read range of the readers based on a location wireless tag having a predetermined distance information from the readers;
a reading part reading an identifier assigned uniquely to each wireless tag by said first reader and a second reader after the read range is changed by the change part; and
a determination part determining a failed wireless tag when an identical identifier cannot be read by the reading part from said first reader and said second reader.

11. The reader control device according to claim 10, wherein the determination part causes the change part to increase a read range of the reader by a predetermined range when an identical identifier cannot be read from said first reader and said second reader, and determines a wireless tag is a failed wireless tag when an identical identifier cannot be read by the reading part from said first reader and said second reader.

12. The reader control device according to claim 10, wherein the calculation part calculates the number of wireless tags and distance information of each wireless tag from the reader, by recognizing an image of each wireless tag or an image of a label including each wireless tag captured by the image capturing part.

13. The reader control device according to claim 10, wherein the image capturing part captures images of a plurality of aligned articles having wireless tags and
wherein the change part changes the read range of the reader based on a plurality of aligned location wireless tags having a predetermined distance information from the readers.

14. The reader control device according to claim 10, wherein the image capturing part captures images of a plurality of articles having wireless tags, the articles which are dispersed on a plane, and
wherein the change part changes the read range of the reader based on a plurality of location wireless tags dispersed on a plane and having a predetermined distance information from the readers.

15. A reader control device for controlling a plurality of readers that transmit/receive information to/from wireless tags, the reader control device comprising:
an image capturing part capturing images of articles having wireless tags and images of the plurality of readers;
a calculation part recognizing an image including a wireless tag and the plurality of readers from among images captured by the image capturing part and calculating an angle formed by the wireless tag, a first reader, and a second reader and an angle formed by the wireless tag, the first reader, and the second reader;
a change part changing reading angles of said first reader and said second reader based on the angles calculated by the calculation part;
a reading part reading an identifier assigned uniquely to each wireless tag by said first reader and said second reader after the reading angles are changed by the change part; and
a determination part determining the wireless tag to be a failed wireless tag when an identical identifier cannot be read by the reading part from said first reader and said second reader.

16. The reader control device according to claim 15, comprising:
a reader control part controlling an emission angle of a beam of the readers.

17. A computer-readable storage medium storing a program for determining a failed wireless tag by a reader control device for controlling a reader that transmits/receives information to/from wireless tags, the program causing the reader control device to execute operations comprising,
capturing images of articles having wireless tags;
recognizing an image including wireless tags by a controller of the reader control device from among images captured and calculating a number of wireless tags and distance information from the reader to each wireless tag based on the recognized image including wireless tags;
changing a read range of the reader by the controller based on a location wireless tag for identification having a predetermined distance information from the reader, and
wherein said changing of the read range of the reader is executed when a number of wireless tags read by the reader and the number of wireless tags calculated do not match and a wireless tag that failed in a reading by the reader is determined based on the read range after said changing by the controller and distance information calculated.

* * * * *

UNITED STATES PATENT AND TRADEMARK OFFICE
CERTIFICATE OF CORRECTION

| | | |
|---|---|---|
| PATENT NO. | : 7,812,727 B2 | Page 1 of 1 |
| APPLICATION NO. | : 12/137168 | |
| DATED | : October 12, 2010 | |
| INVENTOR(S) | : Eiichi Takahashi et al. | |

It is certified that error appears in the above-identified patent and that said Letters Patent is hereby corrected as shown below:

Cover Page Column 2 item (57), (Abstract), Line 4 after "images" insert --,--.

Column 25, Line 13 in Claim 13, delete "tags and" and insert --tags, and--, therefor.

Column 26, Line 20 in Claim 17, delete "comprising," and insert --comprising:--, therefor.

Signed and Sealed this
Eleventh Day of January, 2011

David J. Kappos
*Director of the United States Patent and Trademark Office*